(12) United States Patent
Naito et al.

(10) Patent No.: US 8,107,478 B2
(45) Date of Patent: Jan. 31, 2012

(54) WIRELESS COMMUNICATION DEVICE, COMMUNICATION SYSTEM, COMMUNICATION CONTROL METHOD, AND PROGRAM

(75) Inventors: Masahiko Naito, Tokyo (JP); Katsutoshi Itoh, Tokyo (JP); Takeshi Itagaki, Tokyo (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 12/499,293

(22) Filed: Jul. 8, 2009

(65) Prior Publication Data

US 2010/0046430 A1    Feb. 25, 2010

(30) Foreign Application Priority Data

Aug. 22, 2008 (JP) ................................. 2008-213537

(51) Int. Cl.
*H04L 12/28* (2006.01)
(52) U.S. Cl. ........................................ 370/394; 370/412
(58) Field of Classification Search .................. None
See application file for complete search history.

(56) References Cited

U.S. PATENT DOCUMENTS

| | | | |
|---|---|---|---|
| 7,349,399 B1 | 3/2008 | Chen et al. | |
| 2006/0067232 A1* | 3/2006 | Lee et al. | 370/235 |
| 2006/0176872 A1* | 8/2006 | Serna et al. | 370/351 |
| 2007/0002810 A1 | 1/2007 | Trainin et al. | |
| 2007/0206600 A1* | 9/2007 | Klimker et al. | 370/394 |
| 2008/0008183 A1* | 1/2008 | Takagaki et al. | 370/392 |
| 2008/0095116 A1* | 4/2008 | Kim et al. | 370/331 |
| 2008/0188224 A1* | 8/2008 | Pani et al. | 455/436 |
| 2009/0016335 A1* | 1/2009 | Bays | 370/389 |
| 2009/0268714 A1* | 10/2009 | Ho | 370/352 |

FOREIGN PATENT DOCUMENTS

| | | |
|---|---|---|
| JP | 2005-117458 | 4/2005 |
| JP | 2005-277481 | 10/2005 |
| JP | 2007-166464 | 6/2007 |

OTHER PUBLICATIONS

Liwen Chu, et al., "Simplified DLS Action Frame Transmission in 11Z", No. IEEE 802.11-08/2952r0, XP-002571893, Jan. 3, 2008, pp. 1-9.

Srinivas Kandala, et al., "Direct Link Protocol Specification", IEEE 802.11-02/438r2: Wireless LANs, XP-002314796, Sep. 11, 2002, pp. 1-12.

Hayoung Yoon, et al., "iDLS: Inter-BSS Direct Link Setup in IEEE 802.11 WLANs", 2007 International Symposium on Communications and Information Technologies (ISCIT '07), XP-031166610, Oct. 1, 2007, pp. 1015-1020.

* cited by examiner

*Primary Examiner* — Phirin Sam
(74) *Attorney, Agent, or Firm* — Oblon, Spivak, McClelland, Maier & Neustadt, L.L.P.

(57) ABSTRACT

A wireless communication device includes: a control unit configured to control communication data; and memory configured to store communication data; wherein the control unit performs processing of setting a re-order buffer corresponding to a source address, for storing received data in increments of source address in the memory, storing received packets from a single data source in the re-order buffer corresponding to a source address, and arraying the packet order following sequence numbers set to the received packets.

11 Claims, 19 Drawing Sheets

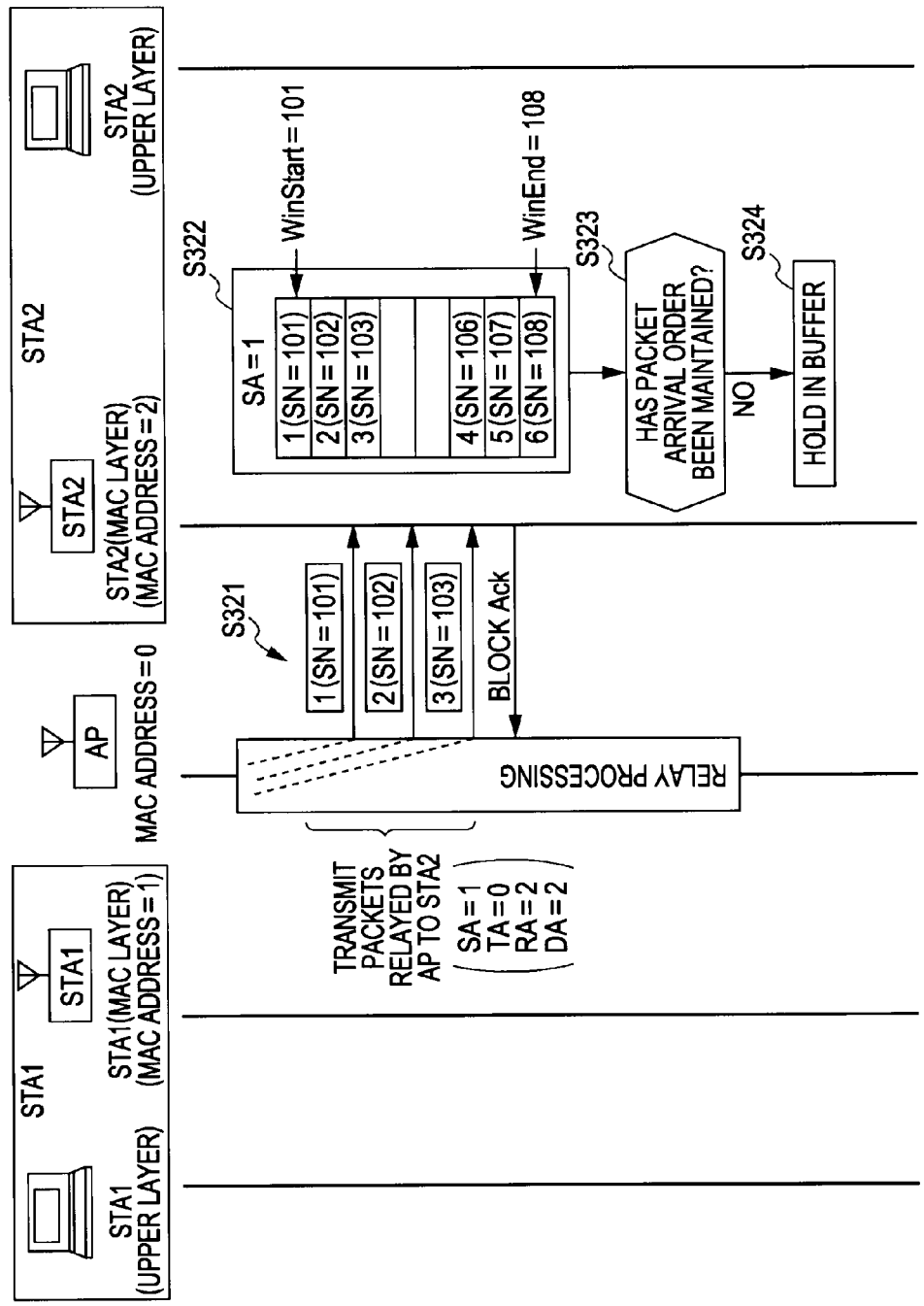

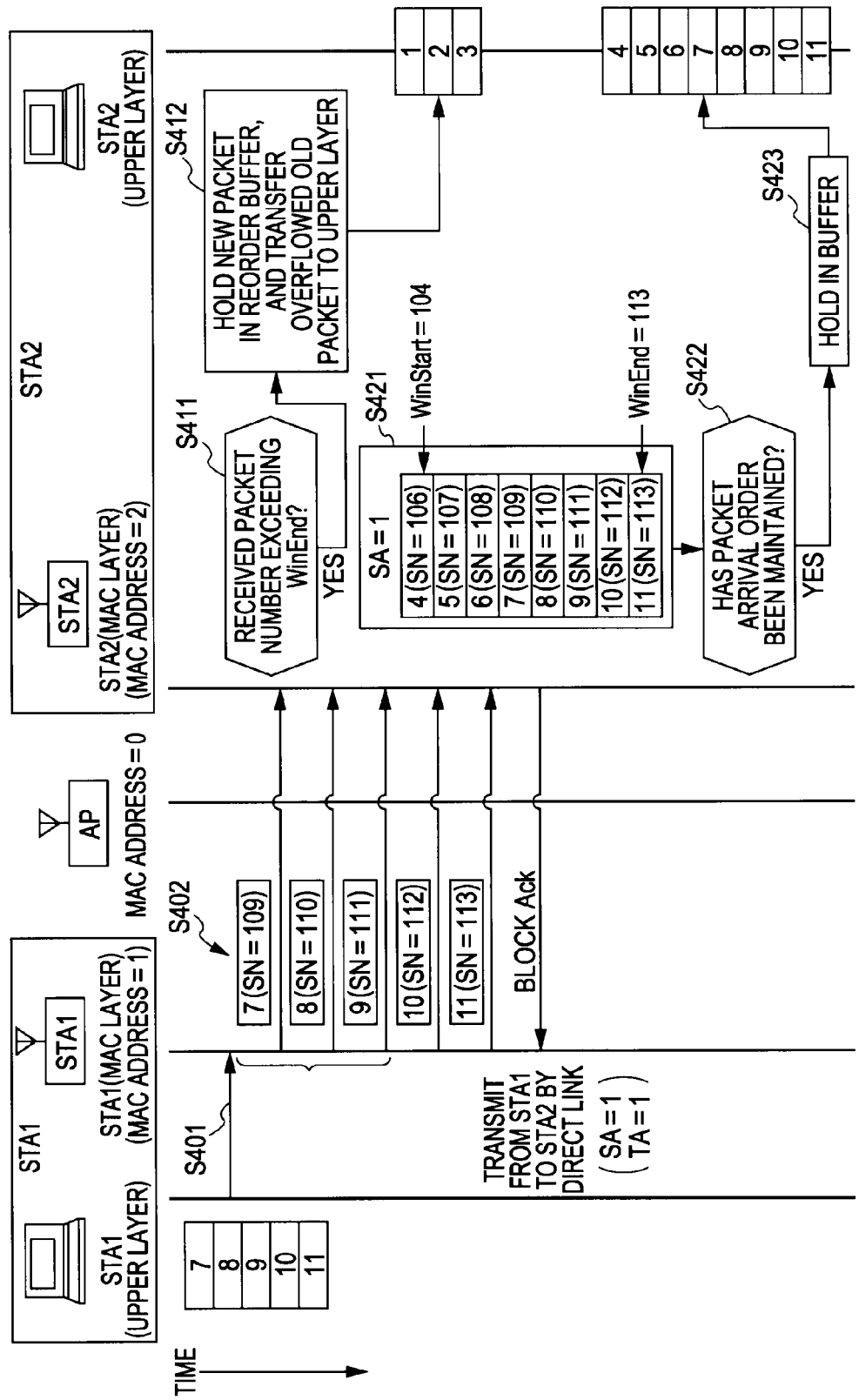

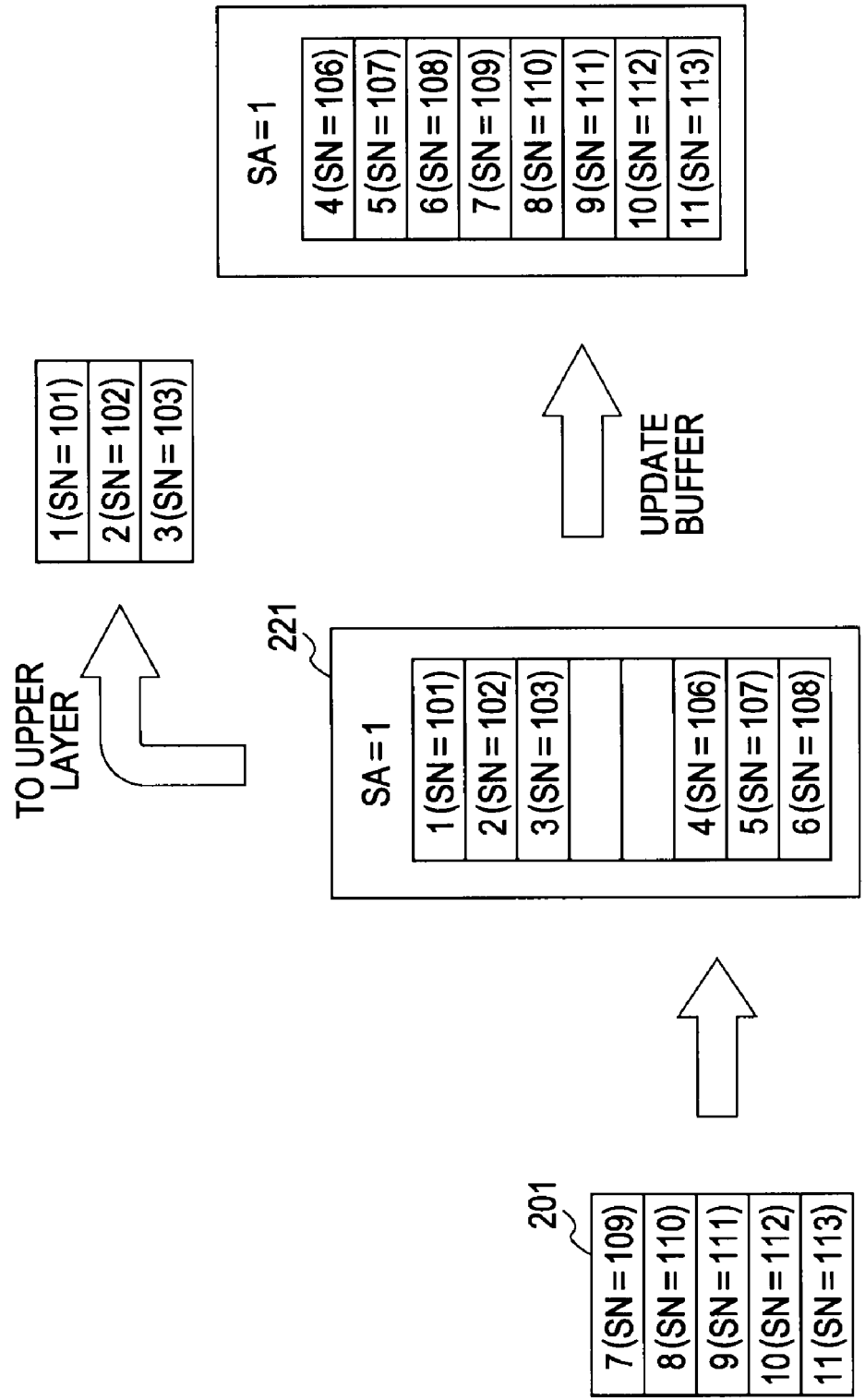

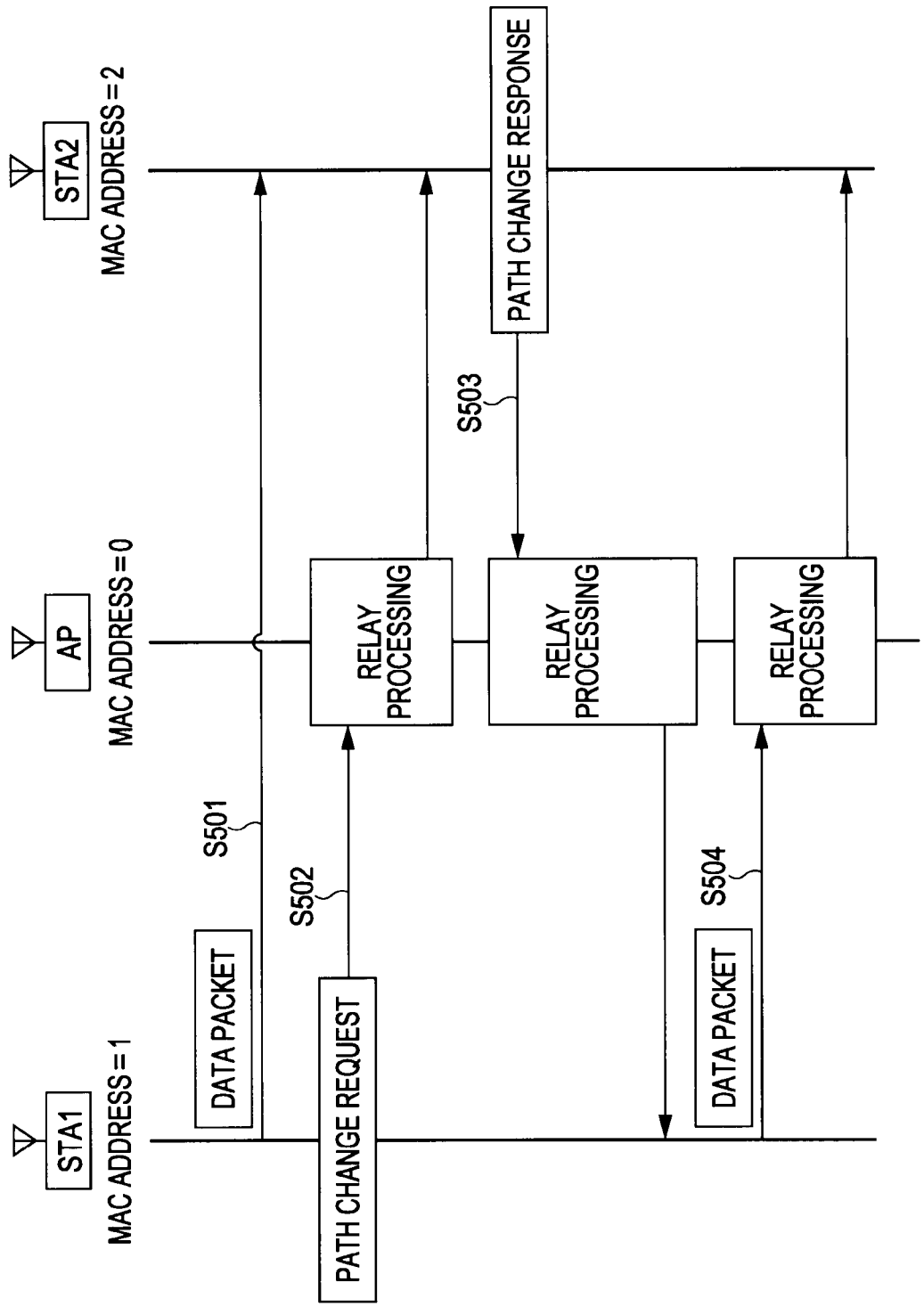

ically for the blocks. In 802.11e, setting different sequence numbers for each packet is stipulated, but in the event that packet misordering of the BlockACK occurs, a situation occurs wherein the blocks themselves cannot be configured.

WIRELESS COMMUNICATION DEVICE, COMMUNICATION SYSTEM, COMMUNICATION CONTROL METHOD, AND PROGRAM

BACKGROUND OF THE INVENTION

1. Field of the Invention

The present invention relates to a wireless communication device, a communication system, a communication control method, and a program, and for example relates to a wireless communication device, a communication system, a communication control method, and a program which perform processing for handling mis-ordering of received packets in conjunction with changing of communication paths or the like.

2. Description of the Related Art

As of recent, wireless networks conforming to wireless LAN standards, of which IEEE 802.00 is representative, are becoming widespread instead of cable networks, due to advantages such as the degree of freedom of devices being high, and so forth. As a result of the wide variety of applications which have come to use wireless networks, there is demand to raise the throughput of the overall system.

Wireless LAN standards (IEEE 802.11) stipulate ad-hoc communication where communication is performed directly between wireless communication devices, and infrastructure mode communication via an access point. Related art disclosing these communication processes include, for example Japanese Unexamined Patent Application Publication No. 2005-117458.

With a communication system defined by the infrastructure mode according to 802.11 shown in FIG. 1, a relay has to be made through an access point AP 30 to perform communication between wireless communication stations STA 10 and 20 at one point. That is to say, communication is performed via an AP-routed path 51, as shown in FIG. 1.

The infrastructure mode had led to lower throughput due to such relating processing. Accordingly, 802.11e has provided an arrangement for improving throughput in communication between wireless communication stations STA, by adding a direct communication mode between the wireless communication stations STA. As shown in FIG. 2, this is a mode for performing direct communication between wireless communication stations STA 10 and 20, and is communication using a directly link path 52 directly connecting the wireless communication stations STA 10 and 20.

Also, a new communication method, TDLS (Tunneled Direct Link Setup), is in the process of being defined of 802.11z, which is a new standard. This method sets direct communication links (directly links) between wireless terminals while maintaining the infrastructure mode, thereby enabling direct communication. Also, an arrangement is being proposed wherein, following setting of direct links, paths used for transmitting to a communication partner (via-access-point path and direct link path) are switched as appropriate.

However, permitting multiple data paths has led to occurrence of a problem wherein, upon dynamically switching paths during data packet transmission, the order of data packets which the MAC layer guarantees to the upper layer at the transmission destination is not maintained. This problem will be described with reference to FIG. 3.

We will assume that, as shown in FIG. 2, with a system configured of an access point AP 30, wireless communication device STA1 10, and wireless communication device STA2 20, data is transmitted from STA1 to STA2. At this time, we assume that both of the two communication paths of the AP-routed path 51, which is a path via the AP, and a direct link path 52, which is a direct communication (Direct Link) path between the STAs, are available for use.

Mis-ordering of packets occurring at the time of switching communication paths will be described with reference to FIG. 3. FIG. 3 illustrates, from the left, a wireless communication device STA1 which is a data transmission terminal, an access point AP serving as a communication relay device, and a wireless communication device STA2 which is a data reception terminal.

Note that the wireless communication device STA1 is illustrated with the upper layer such as applications performing generating and supply processing of communication data and so forth, and the MAC layer which receives the transmission data from the upper layer and performs transmission processing, shown separately. Also, the wireless communication device STA2 is shown with the upper layer and MAC layer separated. Regarding hardware, the upper layer is configured of a data processing unit and so forth, and the MAC layer is configured of a wireless interface unit and so forth. Note that in the following description, the wireless communication device STA1 will be abbreviated to "STA1", the wireless communication device STA2 to "STA2", and the access point AP to "AP".

The steps of the sequence diagram in FIG. 3 will be described. In step S11, upper layer of the STA1 supplies communication packets 1 and 2 to the MAC layer serving as the wireless interface unit. In step S12, the MAC layer transmits the data packet 1 over the path via the AP (AP-routed path). Subsequently, in step S13, the packet 2 is transmitted using the inter-STA direct communication path (direct link path).

The STA2 at the data reception side receives the data packet 1 and the data packet 2. The packet 1 transmitted using the AP-routed path takes transfer time, since relay processing is performed at the AP. As a result, as shown in the drawing, the packet 2 which was transmitted using the inter-STA direct communication path (direct link path) is provided from the MAC layer of the STA2 to the upper layer of the STA2 in step S14 first. Subsequently, in step S16, processing is performed wherein the MAC layer of the STA2 provides the upper layer of the STA2 with the packet 1 received via the AP-routed path in step S15.

As a result, the upper layer of the STA2 receives the packets in the order of packet 2 and packet 1, thereby receiving the packets in an order different from the packet order transmitted from the STA1. Such packet mis-ordering is due to processing delay owing to relaying through the AP, or resending owing to poor communication environment between the AP and STA2.

The data packets 1 and 2 that are transmitted are assigned an ascending sequence number at the STA1 which is the data transmission side. However, at the time of the data packet 1 being subjected to relay processing at the AP, the AP rewrites the sequence number. This is because the sequence number defined by 802.11 is not assigned to End-to-End communication, but to Peer-to-Peer communication. As a result, the original data packet order may not be able to be determined STA2, by using either the arrival order of packets or the sequence number set to the packets. Consequently, the order of packets which the MAC layer provides to the upper layer is not guaranteed.

The example described with reference to FIG. 3 is an example under 802.11, but similar problems occur under data communication sequences following 802.11e as well. With 802.11e, processing is performed wherein sets of multiple data packets from the same transmission source are processed as blocks, with a BlockACK serving as a reception confirmation of a block, and further a re-order buffer executing processing for arraying the packets from the same transmission source in the order of sequence numbers, being used.

Mis-ordering of packets occurring at the time of switching communication paths in the case of performing communication following 802.11e will be described with reference to FIGS. 4 and 5. As with FIG. 3, FIGS. 4 and 5 illustrate, from the left, a wireless communication device STA1 which is a data transmission terminal, an access point AP serving as a communication relay device, and a wireless communication device STA2 which is a data reception terminal. Note that the wireless communication device STA1 and wireless communication device STA2 are shown with the upper layer and the MAC layer separated.

In step S21, the upper layer of the STA1 supplies communication packets 1 through 6 to the MAC layer serving as the wireless interface unit. In step S22, the MAC layer transmits the data packets 1 through 3 via the AP path (AP-routed path). Note that the address information set for the MAC headers of the transmission packets 1 through 3 is as follows.

Source address (SA) indicating the data source=1
Transmitter address (TA) indicating the data source in the case of direct communication=1
Receiver address (RA) indicating the data receiver in the case of direct communication=0
Destination address (DA) indicating the data destination=2

This address information is set to the MAC headers of the packets 1 through 3. Note that the sequence numbers (SN=1 through 3) set by the STA1 are also recorded in the header.

Note that, as shown in the drawings,
MAC address of STA1=1,
MAC address of AP=0,
MAC address of STA1=2,
and the address settings are settings corresponding to these MAC addresses.

Next, in step S23, the MAC layer of the STA1 uses the inter-STA direct communication path (direct link path) to transmit the packets 4 through 6. Note that the address information set to the MAC headers of the transmission packets 4 through 6 is as follows.

Source address (SA) indicating the data source=1
Transmitter address (TA) indicating the data source in the case of direct communication=1
Receiver address (RA) indicating the data receiver in the case of direct communication=2
Destination address (DA) indicating the data destination=2

This address information is set to the MAC headers of the packets 4 through 6. Note that the sequence numbers (SN=14 through 16) set by the STA1 are also recorded in the header.

The STA2 at the data reception side receives the packets 1 through 6. The packet 1 transmitted using the AP-routed path takes more transfer time, since relay processing is performed at the AP.

As a result, as shown in the drawing, the packets 4 through 6 transmitted using the inter-STA direct communication path (direct link path) are received at the MAC layer of the STA2 in step S24 first, and are stored in the re-order buffer. A re-order buffer is set for each direct transmitter of the packets, i.e., for each transmitter address (TA) in the MAC header of the packets. The packets 4 through 6 are stored in a reorder buffer corresponding to TA=1, since TA=1 holds for all of these, and the packet order is ordered following the sequence numbers (SN=14 through 16). In step S25, following confirming that the order of the packets is arrayed in the sequence number order, these are provided to the upper layer. The upper layer first receives the packets 4 through 6.

Subsequently, in step S31 shown in FIG. 5, the AP transmits the packets 1 through 3 to the MAC layer of the STA2, via AP-routed path. Note that the address information set to the MAC headers of the transmission packets 1 through 3 is as follows.

Source address (SA) indicating the data source=1
Transmitter address (TA) indicating the data source in the case of direct communication=0
Receiver address (RA) indicating the data receiver in the case of direct communication=2
Destination address (DA) indicating the data destination=2

This address information is set to the MAC headers of the packets 1 through 3. Note that the sequence numbers (SN=101 through 103) set by the AP are also recorded in the header.

These packets are stored in a re-order buffer by the MAC layer of the STA2 in step S32. As described above, a re-order buffer is set for each direct transmitter of the packets, i.e., for each transmitter address (TA) in the MAC header of the packets. The packets 1 through 3 are stored in a reorder buffer corresponding to TA=0, since TA=0 holds for all of these, and the packet order is ordered following the sequence numbers (SN=101 through 103). In step S33, following confirming that the order of the packets is arrayed in the sequence number order, these are provided to the upper layer. The upper layer receives the packets 1 through 3.

As a result, the upper layer of the STA2 receives the packets in the order of packets 4 through 6 and packets 1 through 3, so the packets are received in an order different from that transmitted from the STA1.

Thus, the re-order buffer defined by 802.11e does not function to array the order of packets from different TAs, though functions to array the order of packets transmitted from the same TA are had. As a result, as with the case of the sequence numbers described with reference to FIG. 3, advantages are manifested with Peer-to-Peer communication, but this does not function to guarantee the orderliness of a packet group transmitted over the AP-routed path (packets 1, 2, and 3) and a packet group arriving over the direct link path (packets 4, 5, and 6).

One way to solve this problem is to use a mesh sequence number newly defined in 802.11s (a draft 802.11 amendment). A mesh sequence number is set as an unchanged sequence number for End-to-End, which is the data source and data destination. The mesh sequence number is recorded in the header information of a data packet, along with the already-existing sequence number corresponding to the Peer-to-Peer.

FIG. 6 illustrates a header configuration example of a packet compliant with 802.11s. As shown in the drawing, in the header, a sequence number corresponding to Peer-to-Peer which already exists is recorded in the "Sequence Control" space, and further, an unchanged sequence number for End-to-End, which is the data source and data destination, is recorded in the "Mesh Sequence Number" space.

An example of a communication sequence in the case of switching communication paths in the case of performing communication will be described with reference to FIGS. 7 and 8. FIGS. 7 and 8 also illustrate, from the left, a wireless communication device STA1 which is a data transmission terminal, an access point AP serving as a communication relay device, and a wireless communication device STA2 which is a data reception terminal. Note that the wireless communication device STA1 and wireless communication device STA2 are shown with the upper layer and the MAC layer separated.

In step S51, the upper layer of the STA1 supplies communication packets 1 through 6 to the MAC layer serving as the wireless interface unit. In step S52, the MAC layer transmits the data packets 1 through 3 via the AP path (AP-routed path). Note that the address information set for the MAC headers of the transmission packets 1 through 3 is as follows.

Source address (SA) indicating the data source=1
Transmitter address (TA) indicating the data source in the case of direct communication=1
Receiver address (RA) indicating the data receiver in the case of direct communication=0
Destination address (DA) indicating the data destination=2
This address information is set to the MAC headers of the packets 1 through 3.

Note that the following information set by the STA1 is also recorded in the header.

Sequence numbers (SN=1 through 3)
Mesh sequence numbers (MSN=1 through 3)
Note that, as shown in the drawings,
MAC address of STA1=1,
MAC address of AP=0,
MAC address of STA1=2,
and the address settings are settings corresponding to these MAC addresses.

Next, in step S53, the MAC layer of the STA1 uses the inter-STA direct communication path (direct link path) to transmit the packets 4 through 6. Note that the address information set to the MAC headers of the transmission packets 4 through 6 is as follows.

Source address (SA) indicating the data source=1
Transmitter address (TA) indicating the data source in the case of direct communication=1
Receiver address (RA) indicating the data receiver in the case of direct communication=2
Destination address (DA) indicating the data destination=2
This address information is set to the MAC headers of the packets 4 through 6. Note that the following information set by the STA1 is also recorded in the header.

Sequence numbers (SN=14 through 16)
Mesh sequence numbers (MSN=4 through 6)

The STA2 at the data reception side receives the packets 1 through 6. The packet 1 transmitted using the AP-routed path takes more transfer time, since relay processing is performed at the AP.

As a result, as shown in the drawing, the packets 4 through 6 transmitted using the inter-STA direct communication path (direct link path) are received at the MAC layer of the STA2 in step S54 first, and are stored in the re-order buffer. A re-order buffer is set for each direct transmitter of the packets, i.e., for each transmitter address (TA) in the MAC header of the packets. The packets 4 through 6 are stored in a reorder buffer corresponding to TA=1, since TA=1 holds for all of the packets 4 through 6, and the packet order is ordered following the sequence numbers (SN=14 through 16). In step S55, confirmation is made that the order of the packets is arrayed in the sequence number order, following which in step S56, these are stored in a re-order buffer performing re-ordering processing in increments of End-to-End, which is the data source and data destination.

In step S57, the packet order is arrayed based on the mesh sequence numbers, in a re-order buffer which performs re-ordering processing in increments of data source (SA). In step S58, following confirmation that the order of the packets has been arrayed in mesh sequence number order, these are held in the buffer without change.

Subsequently, in step S61 shown in FIG. 8, the AP transmits the packets 1 through 3 to the MAC layer of the STA2, via AP-routed path. The address information set to the MAC headers of the transmission packets 1 through 3 is as follows.

Source address (SA) indicating the data source=1
Transmitter address (TA) indicating the data source in the case of direct communication=0
Receiver address (RA) indicating the data receiver in the case of direct communication=2
Destination address (DA) indicating the data destination=2
This address information is set to the MAC headers of the packets 1 through 3.

Note that the following information set by the AP
sequence numbers (SN=101 through 103)
and the following information set by the STA1
sequence numbers (SN=1 through 3)
are recorded in the header.

These packets are stored in step S62 by the MAC layer of the STA2, in a re-order buffer which is set for each transmitter address (TA). The packets 1 through 3 are stored in a reorder buffer corresponding to TA=0, since TA=0 AP holds for all of these, and the packet order is ordered following the sequence numbers (SN=101 through 103) given by the AP. In step S63, confirmation is made that the order of the packets is arrayed in the sequence number order, following which in step S64, these are stored in a re-order buffer performing re-ordering processing in increments of End-to-End, which is the data source and data destination.

In step S65, the packet order is arrayed in a re-order buffer which performs re-ordering processing in increments of data source (SA). The packets 4 through 6, already received, are already stored in this re-order buffer in accordance with the mesh sequence number. The packets 1 through 3 are further stored in this buffer, and the overall packets 1 through 6 are arrayed following the mesh sequence number. In step S66, following confirming that the order of the packets is arrayed in the mesh sequence number order, these are provided to the upper layer. The upper layer receives the packets 1 through 6 arrayed following the mesh sequence number.

As a result, the upper layer of the STA2 receives the packets in the order of packets 1 through 6, and accordingly receives the packets in the same order as the packet order transmitted by the STA1.

However, with this method, the mesh sequence number of the header has to be recorded. Also, a re-order buffer for arraying the packet order following the mesh sequence number has to be provided at the data reception side, and perform new processing. As a result, there are newly occurring problems of deterioration in throughput due to increased overhead in packet header information, and increase in the circuit scale at the reception side.

SUMMARY OF THE INVENTION

There has been found demand for a configuration wherein a reception side can process packets communicated between communication devices following the order transmitted.

There has been found demand for a wireless communication device, a communication system, a communication control method, and a program, capable of resolving mis-ordering in received data, without adding new header information, nor adding a new re-order buffer.

According to an embodiment of the present invention, a wireless communication device includes: a control unit for controlling communication data; and memory for storing communication data; wherein the control unit performs processing of setting a re-order buffer corresponding to a source address, for storing received data in increments of source address in the memory, storing received packets from a single data source in the re-order buffer corresponding to a source address, and arraying the packet order following sequence numbers set to the received packets.

The received packets may be packets where a sequence number set for each data destination address is recorded at the data source, with the sequence numbers not being rewritten at a relay point.

The control unit may be of a configuration which performs processing of returning a path change response in response to a path change request received from the data source; and stores and transmits, in the path change response, the information of (a) the sequence number of the last packet received from the source at the point-in-time of reception of the path change request (Latest Sequence Number), and (b) a last sequence number storable in the re-order buffer corresponding to a source address (WinEnd).

The control unit may perform the processing of storing packets received from the data source following the path change response in the re-order buffer corresponding to a source address, and in a case of receiving a new received packet having a sequence number later than the last sequence number storable in the re-order buffer corresponding to a source address (WinEnd), store the newly received packet in the re-order buffer corresponding to a source address, and obtain a packet having a preceding sequence number from the re-order buffer corresponding to a source address.

Further, according to another embodiment of the present invention, a wireless communication device includes: a control unit for controlling communication data; wherein the control unit transmits packets where sequence numbers set for each data destination address are set in the header, performs processing of transmitting a path change request to the data destination address at the time of changing the packet transmission path, and receiving a path change response as a reply, and performs processing of determining a sequence number to set in the header of a packet to be transmitted over a new path after path change, using the information of (a) the sequence number of the last packet received from the source at the point-in-time of reception of the path change request (Latest Sequence Number), and (b) a last sequence number storable in the re-order buffer corresponding to a source address (WinEnd), included in the path change response.

The control unit may set a sequence number X to be set in the header of a packet to be transmitted over a new path after path change so as to satisfy the conditional expression Latest Sequence Number<X≦WinEnd.

According to an embodiment of the present invention, a communication system is made up of a plurality of wireless communication devices which perform data transmission/reception; wherein a transmission device which transmits data performs processing of transmitting a path change request to the data destination address at the time of changing the packet transmission path, and receiving a path change response as a reply, and performs processing of determining a sequence number to set in the header of a packet to be transmitted over a new path after path change, using the information of (a) the sequence number of the last packet received from the source at the point-in-time of reception of the path change request (Latest Sequence Number), and (b) a last sequence number storable in the re-order buffer corresponding to a source address (WinEnd), included in the path change response; and wherein a reception device which receives data performs processing of returning a path change response storing the information of (a) and (b) in response to the path change request from the transmission device.

According to an embodiment of the present invention, a wireless communication method executed at a wireless communication device includes the steps of: setting of a re-order buffer corresponding to a source address, for storing received data in increments of source address in memory; and storing of received packets from a single data source in the re-order buffer corresponding to a source address, and arraying the packet order following sequence numbers set to the received packets.

According to an embodiment of the present invention, a wireless communication method executed at a wireless communication device includes the steps of: transmitting of packets where sequence numbers set for each data destination address are set in the header, transmitting of a path change request to the data destination address at the time of changing the packet transmission path, and receiving a path change response as a reply; and determining of a sequence number to set in the header of a packet to be transmitted over a new path after path change, using the information of (a) the sequence number of the last packet received from the source at the point-in-time of reception of the path change request (Latest Sequence Number), and (b) a last sequence number storable in the re-order buffer corresponding to a source address (WinEnd), included in the path change response.

According to an embodiment of the present invention, a program for executing communication control at a wireless communication device includes the steps of: setting of a re-order buffer corresponding to a source address, for storing received data in increments of source address; and storing of received packets from a single data source in the re-order buffer corresponding to a source address, and arraying the packet order following sequence numbers set to the received packets.

According to an embodiment of the present invention, a program for executing communication control at a wireless communication device includes the steps of: transmitting of packets where sequence numbers set for each data destination address are set in the header, transmitting of a path change request to the data destination address at the time of changing the packet transmission path, and receiving a path change response as a reply; and determining of a sequence number to set in the header of a packet to be transmitted over a new path after path change, using the information of (a) the sequence number of the last packet received from the source at the point-in-time of reception of the path change request (Latest Sequence Number), and (b) a last sequence number storable in the re-order buffer corresponding to a source address (WinEnd), included in the path change response.

In the above configuration, the program can be provided to a general-purpose system capable of executing various types of program codes, by a storage medium or communication medium, in a computer-readable format. Providing such a program in a computer-readable format realizes processing on the computer system corresponding to the program.

According to the above configurations, mis-ordering of packets, occurring due to switching of communication paths for example, can be prevented. The data transmitter sets sequence numbers for each data destination address, and the relay point transmits without rewriting the sequence number. At the packet reception side, a re-order buffer corresponding to a source address is set which stores received data in increments of source addresses, and the packet order is arrayed following the sequence number set to the received packets. Also, path change requests and responses are exchanged between the data transmitter and receiver, with information such as sequence numbers which have been received at the receiver being notified to the transmitter, and the transmitter determining the sequence numbers of packets to be transmitted using the new path, using this information. Thus, data can be received by the upper layer of the reception device in an order matching the order of the transmitted data.

Other objects, features, and advantages of the present invention will become apparent from detailed description by way of embodiments and the attached drawings. Note that the term "system" as used in the present Specification implies a logical group configuration of multiple devices, and is not restricted to the devices of each configuration being within the same housing.

BRIEF DESCRIPTION OF THE DRAWINGS

FIG. 17 is a diagram describing a communication sequence involving path switching according to an embodiment of the present invention;

FIG. 18 is a diagram describing a communication sequence involving path switching according to an embodiment of the present invention;

FIG. 19 is a diagram describing processing which a data receiving side performs using a re-order buffer, in communication processing involving path switching according to an embodiment of the present invention; and FIG. 20 is a diagram describing a communication sequence involving path switching according to an embodiment of the present invention.

DESCRIPTION OF THE PREFERRED EMBODIMENTS

The following is a detailed description of a wireless communication device, communication system, a communication control method, and a program, described by way of embodiments of the present invention, with reference to the drawings.

Figure 9:
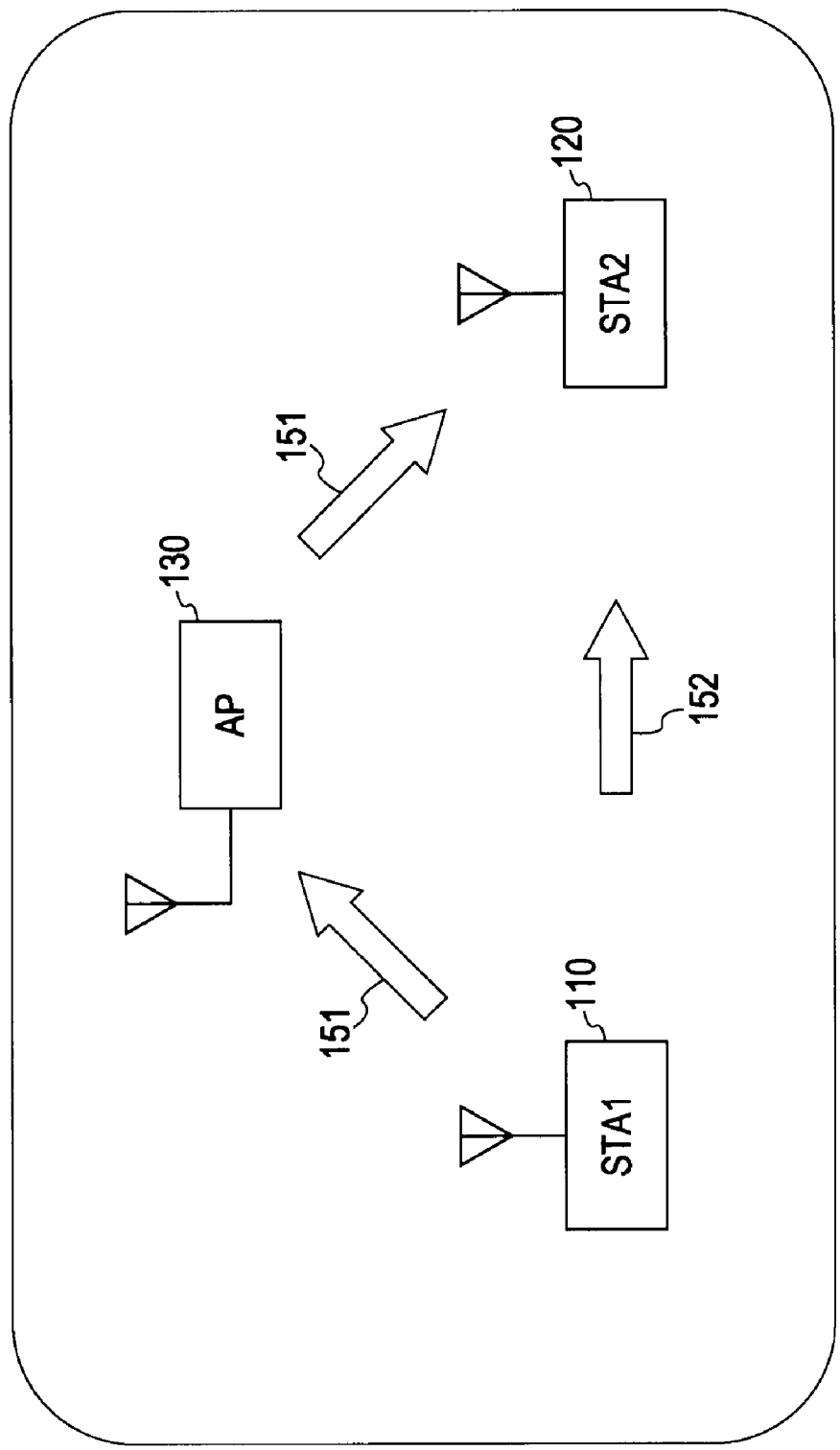
FIG. 9 is a diagram describing a configuration example of a communication processing system according to an embodiment of the present invention.

A wireless communication system according to an embodiment the present invention will be described with reference to FIG. 9. FIG. 9 illustrates a wireless communication device STA1 110 and a wireless communication device STA2 120 as two wireless terminals which perform data communication, and also an access point AP 130 which performs communication relay processing between the wireless communication devices.

The wireless communication device STA1 110 and wireless communication device STA2 120 have functions of performing communication selectively using multiple communication paths, i.e., an AP-routed path 151 and direct link path 152. The access point AP 130 performs packet relay processing for communication via the AP-routed path 151.

While embodiments of the present invention will be described later, with a system according to a first embodiment for example, the access point AP 130 does not perform rewriting of sequence numbers set in the header of relay packets. That is to say, if a transmission packet from the wireless communication device STA1 110 to the wireless communication device STA2 120, this is transferred to the wireless communication device STA2 120 without changing the sequence number set by the wireless communication device STA1 110.

With a system according to a second embodiment, the access point AP 130 performs rewriting of sequence numbers set to the header of the relayed packet, in the same way as with the related art. These embodiments will be described later in detail.

We will say that the wireless communication device STA1 110 and the wireless communication device STA2 120 has completed association as a connection request as to the access point AP 130, so that the AP-routed path 151 connecting the wireless communication device STA1 110 to the wireless communication device STA2 120 via the access point AP 130 shown in FIG. 9 is usable.

In the following description, we will say that the wireless communication device STA1 110 is the data transmitting side, and the wireless communication device STA2 120 is the data receiving side. Upon processing for DLS (Direct Link Set-up) being completed as set-up processing of performing direct communication between the wireless communication devices, the direct link path 152 directly connecting the wireless communication device STA1 110 and the wireless communication device STA2 120 as shown in FIG. 9 is usable.

Figure 10:
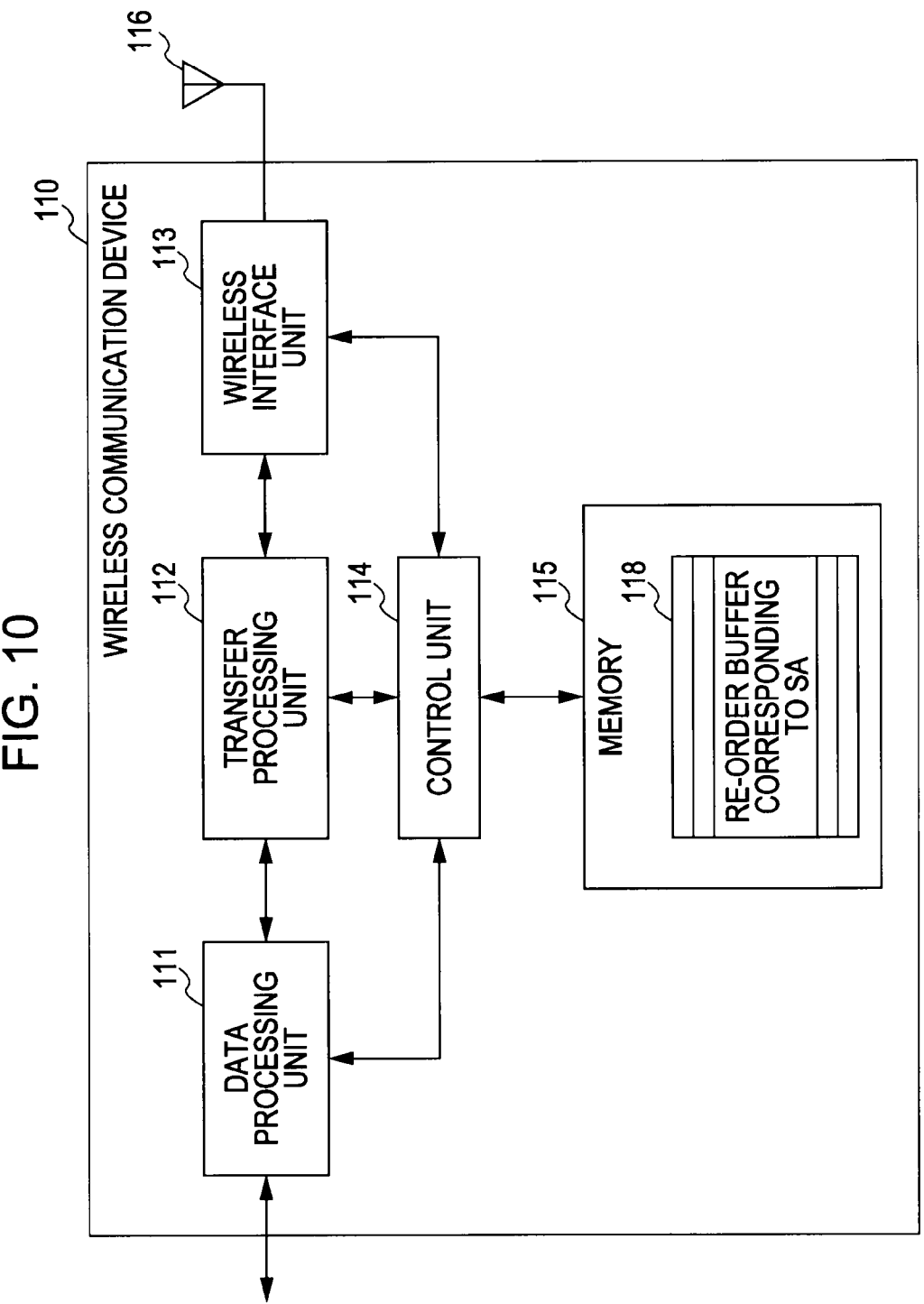
FIG. 10 is a diagram describing a configuration example of a wireless communication device according to an embodiment of the present invention.

FIG. 10 is a block diagram illustrating the configuration of the wireless communication device STA1 110. The wireless communication device STA2 120 also has the same configuration. As shown in FIG. 10, the wireless communication device 110 has a data processing unit 111, a transfer processing unit 112, a wireless interface unit 113, a control unit 114, memory 115, and an antenna 116.

The data processing unit 111 creates packets storing communication data. The transfer processing unit 112 performs addition of headers, error detection code, and so forth, to the packets generated at the data processing unit 111, and provides the post-processing data to the wireless interface unit 113. The wireless interface unit 113 converts the data received from the transfer processing unit 112 into modulated signals, and transmits the modulated signals via the antenna 116.

As for a data reception operation, data received via the antenna 116 is subjected to demodulation of the received signals at the wireless interface unit 113, the transfer processing unit 112 performs analysis of the header, which is then handed to the data processing unit 111. The data processing unit 111 obtains the communication data from the packets. The control unit 114 centrally control the processing of the above components. Also, data stored in the memory 115 is obtained and provided to the data processing unit 111 to be used as data to be stored in packets. Alternatively, data which the data processing unit 111 has obtained from packets is stored in the memory 115. In addition to communication data, the memory 115 stores programs for communication control, and the control unit 114 executes communication control following the programs.

The memory 115 includes a re-order buffer 118 corresponding to source address (SA). The re-order buffer 118 is a buffer which stores packets in a sequence order following the sequence number set to the MAC header of the packets for example, under control of the control unit 114 or transfer processing unit 112. The re-order buffer 118 is managed in increments of source addresses (SA). The control unit 114 sets the re-order buffer 118 corresponding to source address, which stores received data in increments of source addressees, in the memory 115, stores received packets from a single data source in the re-order buffer 118 corresponding to this source address, and performs processing for arraying the packet order following the sequence number set in the received packets.

First Embodiment

In the configuration of a first embodiment described below, the access point AP does not change the sequence number set in the header for the data packets relayed though the AP-routed path. That is to say, with this setting, the original sequence number set by the packet source is not changed and reaches the destination. Accordingly, the order of received packets can be matched with the transmitting order at the source (the sequence number order set at the source) and stored, in increments of source addresses (SA), in the re-order buffer of the data receiving device in cases of using a direct link path, in cases of using a AP-routed path, and in cases of including both by switching the two paths.

The sequence number set at the data source is recorded in the MAC header of a packet. The access point AP which is a relay point does not rewrite the sequence number, but simply copies and transfers. The wireless communication device according to the present embodiment stores received packets in the re-order buffer so as to be managed in increments of source addresses (SA), and arrays and stores the packets in an order following the sequence numbers set in the headers.

Figure 11:
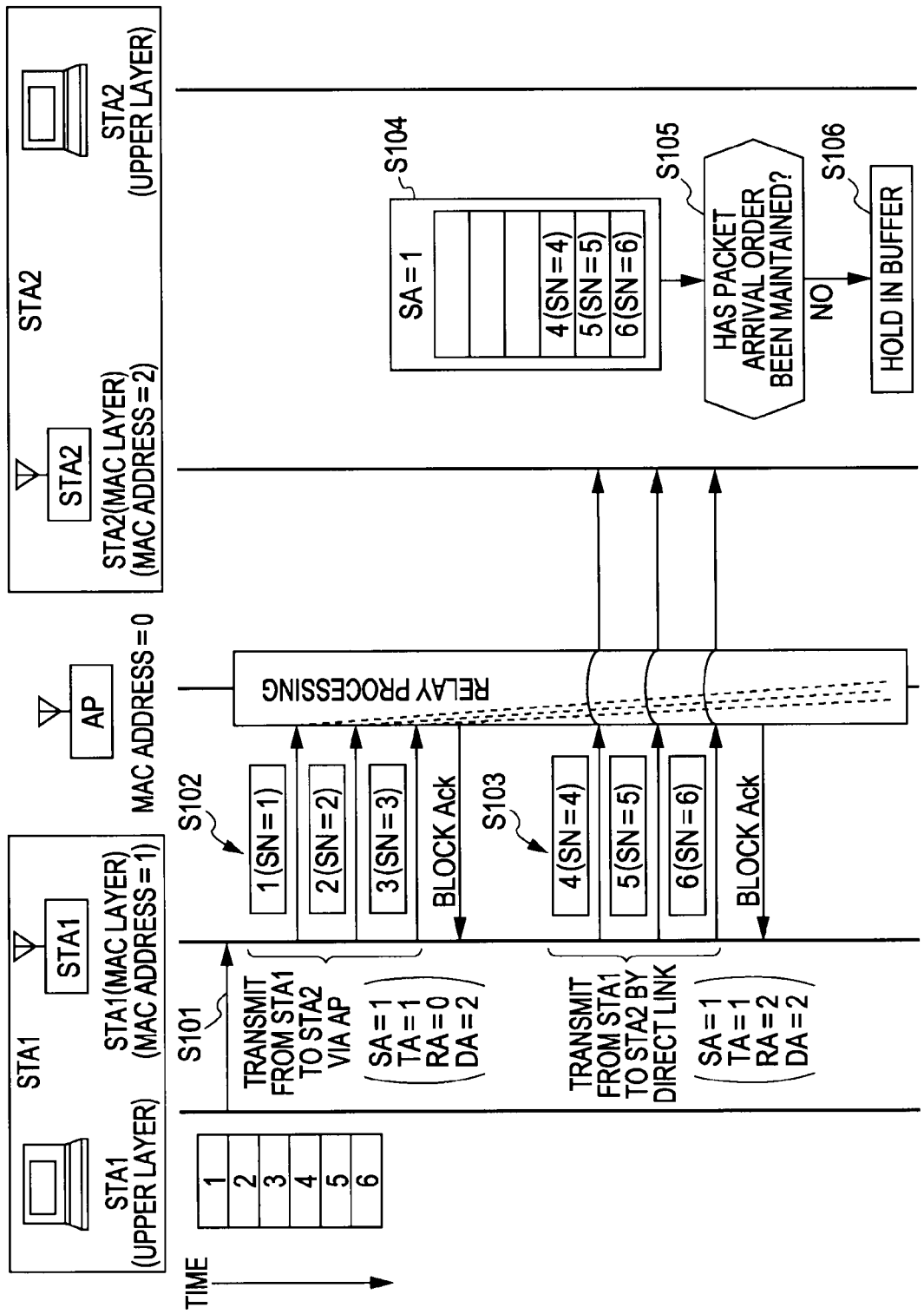
FIG. 11 is a diagram describing a communication sequence involving path switching according to an embodiment of the present invention.
Figure 12:
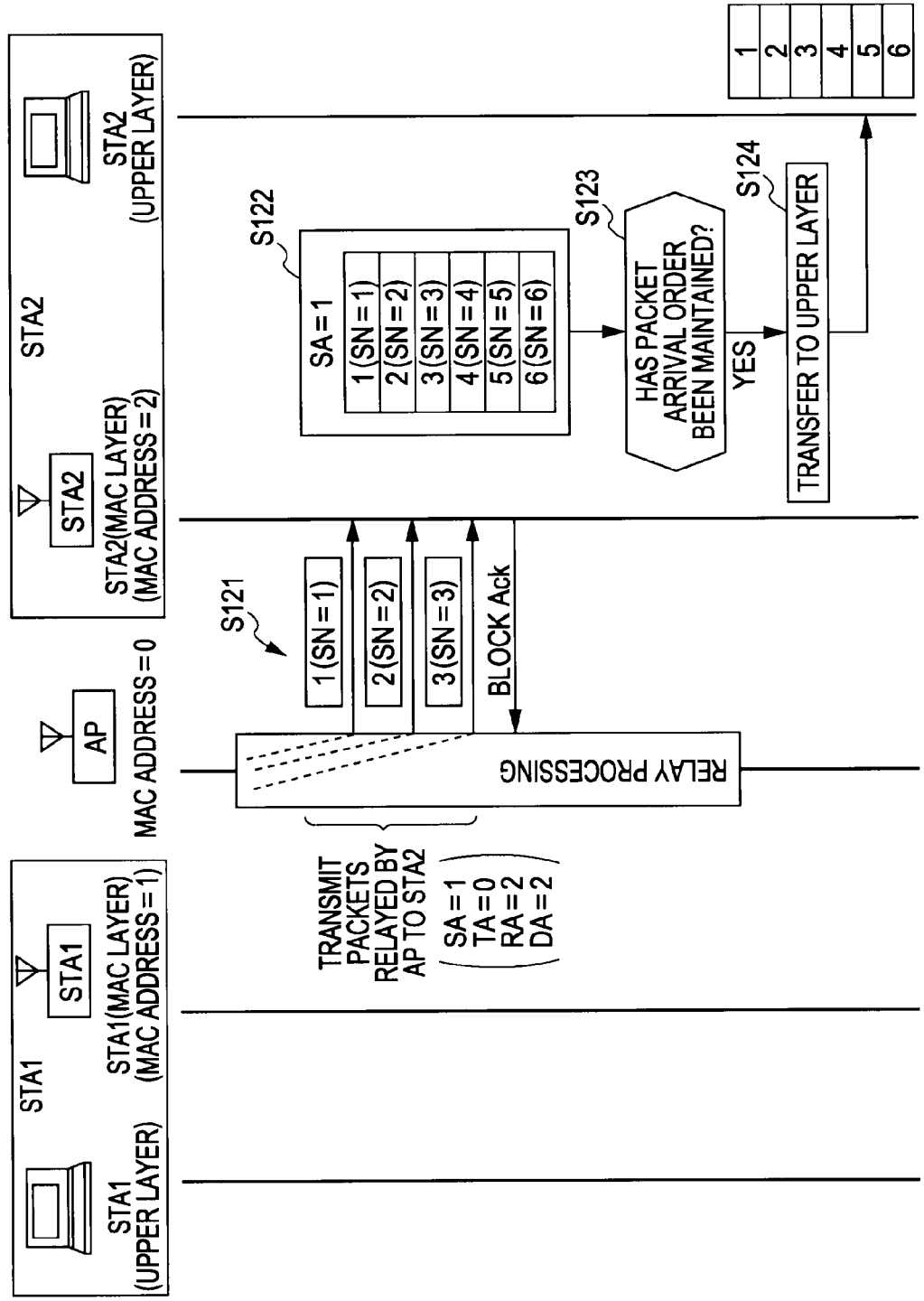
FIG. 12 is a diagram describing a communication sequence involving path switching according to an embodiment of the present invention.

An overview of the communication processing sequence following the first embodiment of the present invention will be described with reference to FIGS. 11 and 12. FIGS. 11 and 12 illustrate, from the left, a wireless communication device STA1 which is a data transmission device, an access point AP serving as a communication relay device, and a wireless communication device STA2 which is a data reception device.

Note that the wireless communication device STA1 is illustrated with the upper layer such as applications performing generating and supply processing of communication data and so forth, and the MAC layer which receives the transmission data from the upper layer and performs transmission processing, shown separately. Also, the wireless communication device STA2 is shown with the upper layer and MAC layer separated. Regarding hardware, the upper layer is configured of a data processing unit and so forth, and the MAC layer is configured of a wireless interface unit and so forth. Moreover, control is performed of both the upper layer and MAC layer under control of the control unit.

Note that in the following description, the term "wireless communication device STA1" will be abbreviated to "STA1", and "wireless communication device STA2" to "STA2".

The STA1, which is the data source, manages the sequence numbers set in the packet headers, at the time of transmitting data packets, in increments of destination addresses. That is to say, management is performed in End-to-End increments.

In the example shown in FIG. 11, the STA1, which is the data source, transmits packets 1 through 6 with the STA2 as the destination. The packets 1 through 3 are transmitted using the AP-routed path, and the packets 4 through 6 are transmitted using the direct link path.

The destination addresses (DA) of the packets 1 through 6 are the MAC address=2 of the STA2, and are all the same. Accordingly, the STA1 sets consecutive sequence numbers to the packets 1 through 6. With the present example, sequence numbers 1 through 6 are set for the packets 1 through 6.

The packets 1 through 3 transmitted over the AP-routed path are temporarily received at the access point AP and then resent from the AP to the STA2. At the time of relaying the data packets, the sequence numbers set to the headers of the received packets are maintained and transmitted to the destination STA2.

The STA2 which is the reception device uses the re-order buffer in increments of source addresses (SA) to manage the received packets by arraying in the order following the sequence number of received packets in increments of source addresses (SA). That is to say, packet management is performed in End-to-End increments.

In the example shown in FIGS. 11 and 12, the source of all data packets 1 through 6 is STA1, with an SA (Source Address)=1. Accordingly, at the STA2, the packets 1 through 6 are all stored in the same re-order buffer, and the packet order is arrayed following the sequence number.

The STA2 holds the data packets in a re-order buffer corresponding to SA=1, and performs processing for storing packets of both the AP-routed path and the direct link path in the same re-order buffer corresponding to SA=1 and arraying the packet order following the sequence numbers. Following the processing, the packets are provided to the applications or the like at the upper layer.

Figure 1:
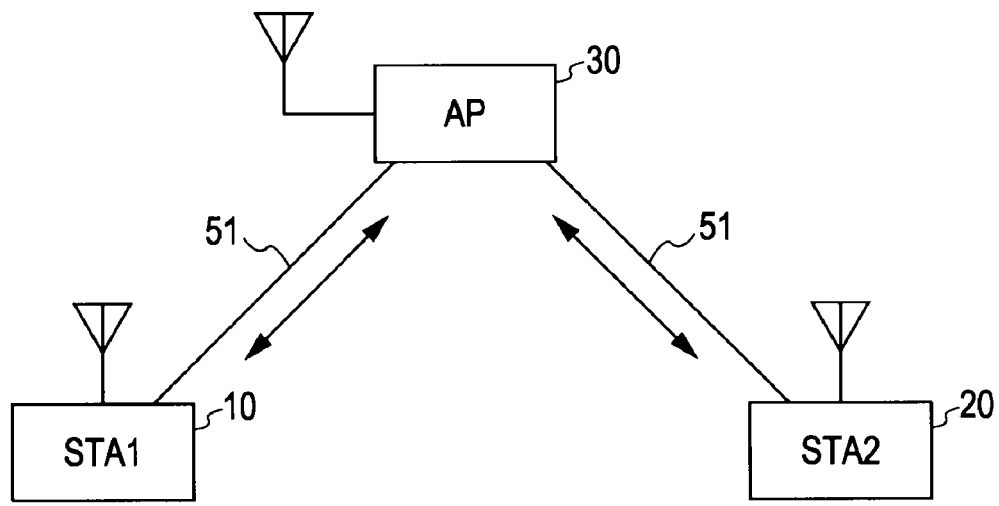
FIG. 1 is a diagram describing communication processing via an AP-routed path.
Figure 2:
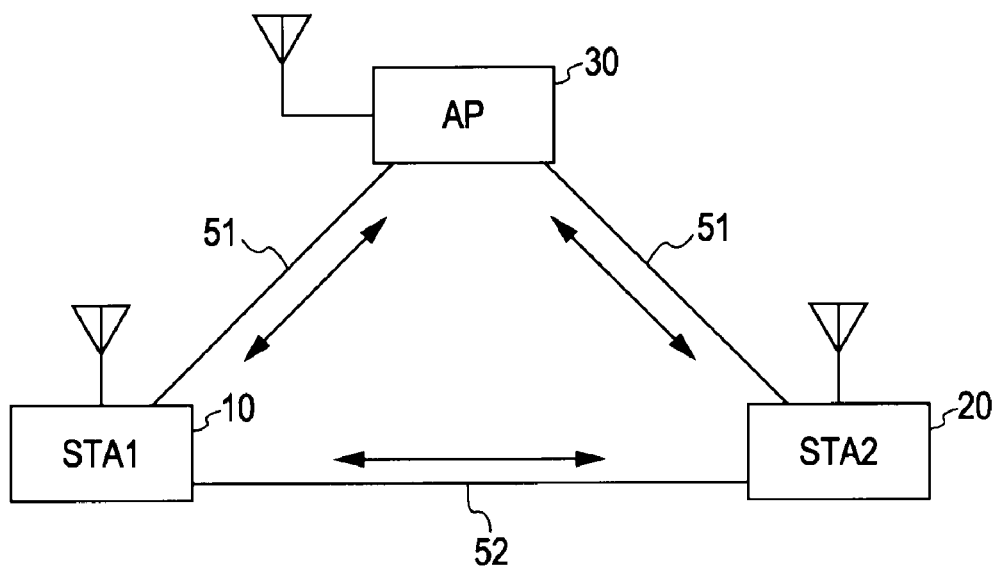
FIG. 2 is a diagram describing communication processing via an AP-routed path and direct link path.
Figure 3:
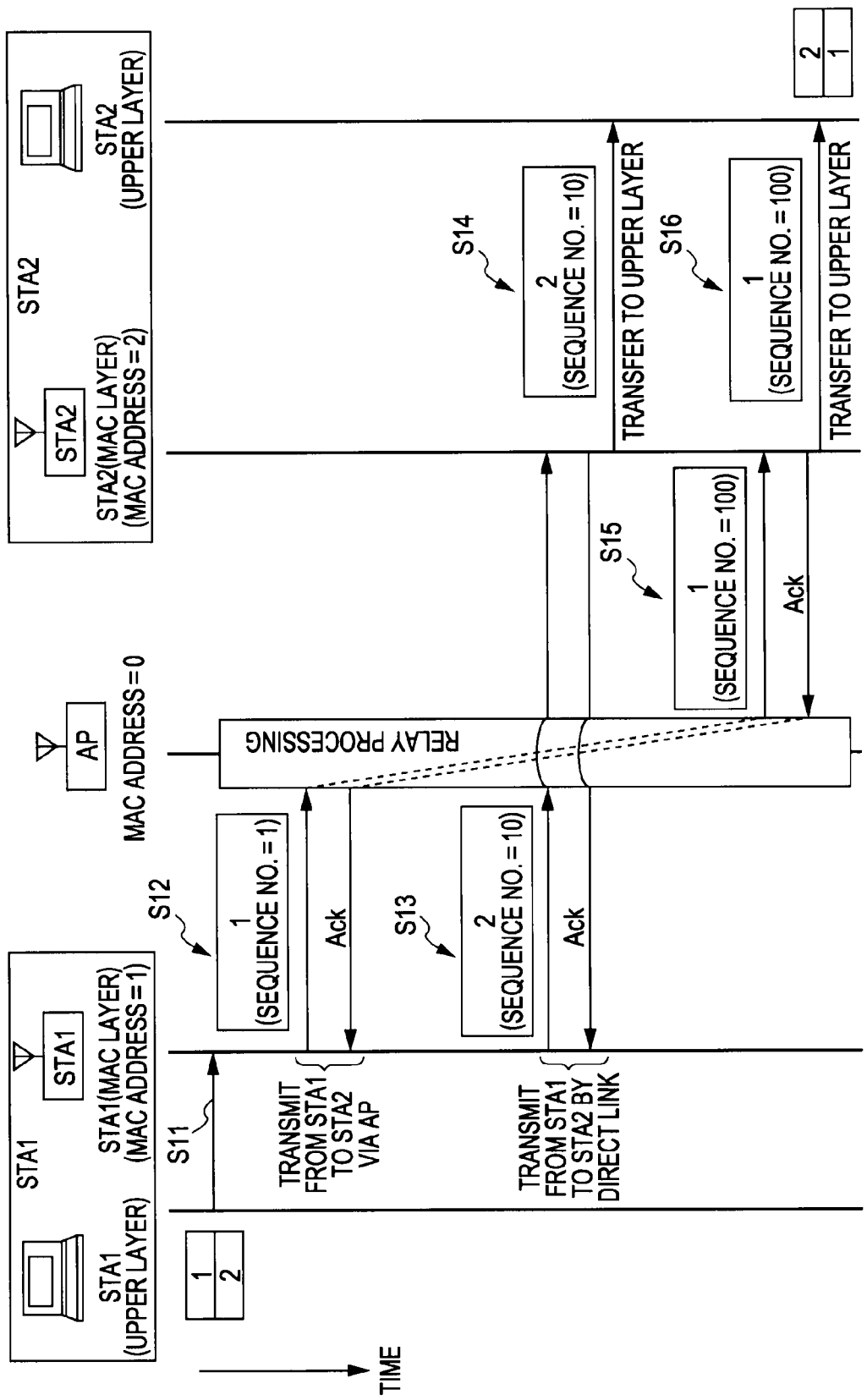
FIG. 3 is a diagram describing mis-ordering of received frames due to switching of communication paths.
Figure 4:
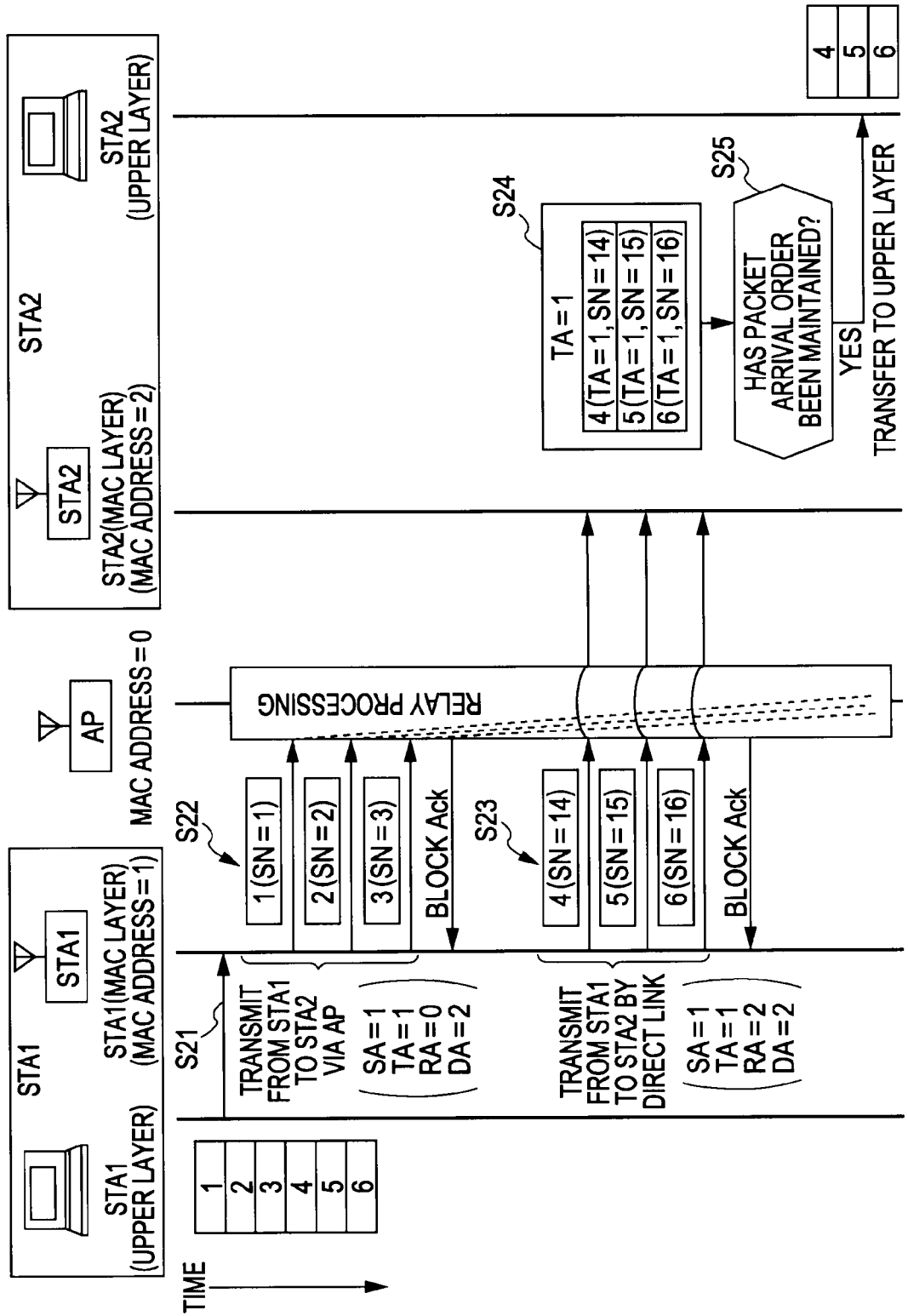
FIG. 4 is a diagram describing mis-ordering of received frames due to switching of communication paths.
Figure 5:
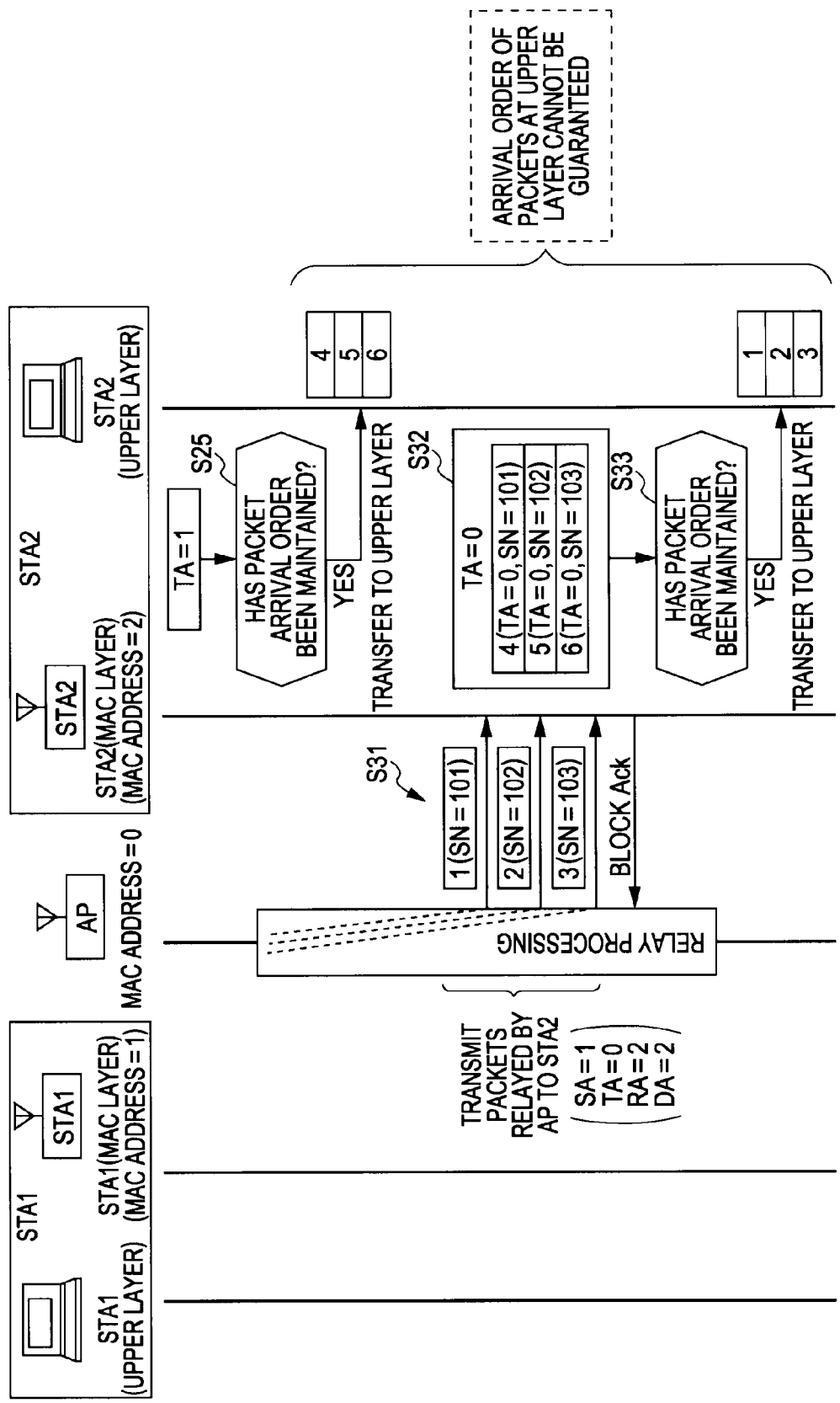
FIG. 5 is a diagram describing mis-ordering of received frames due to switching of communication paths.
Figure 6:
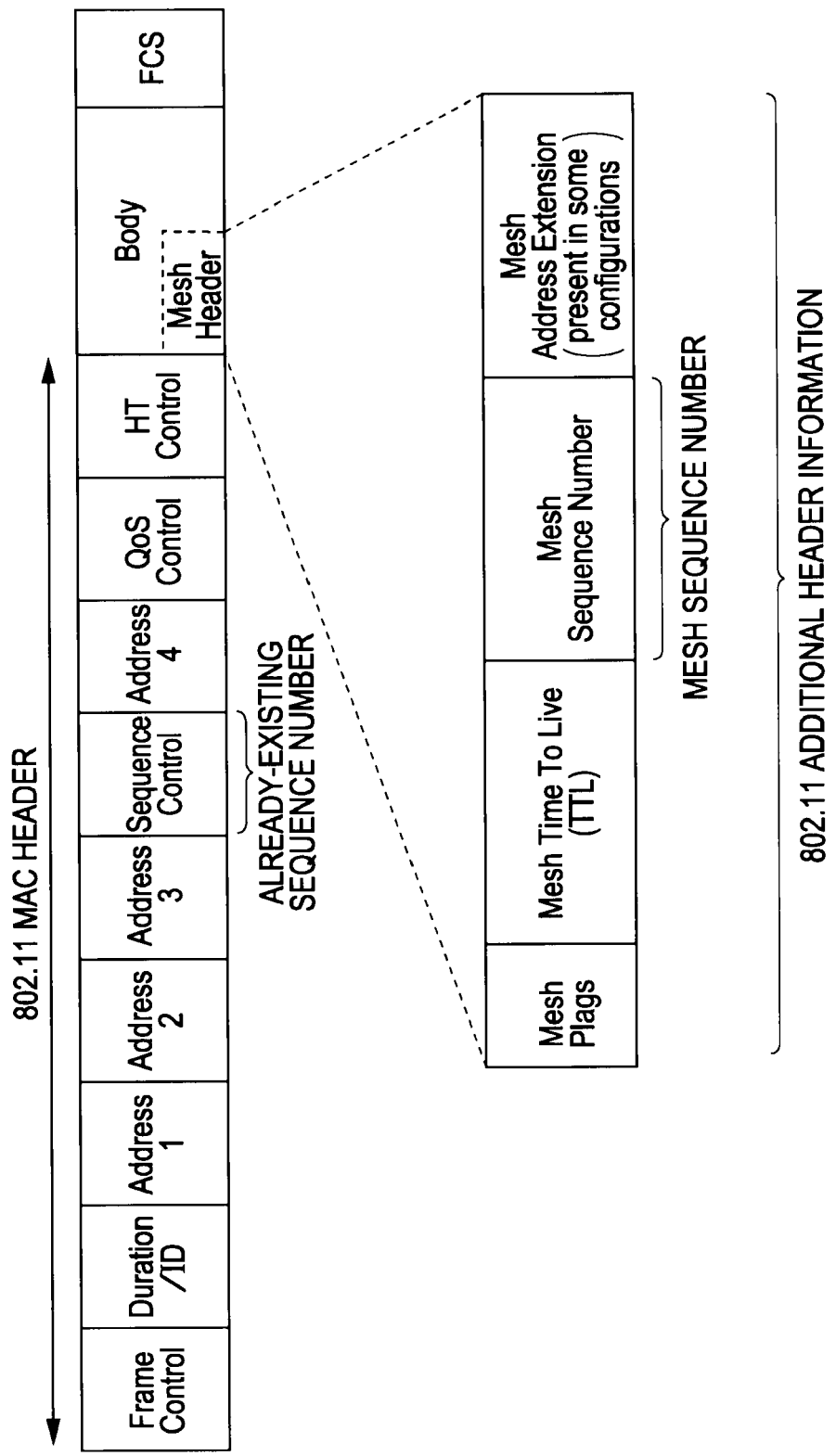
FIG. 6 is a diagram describing a configuration example of a header to be set to a communication packet.
Figure 7:
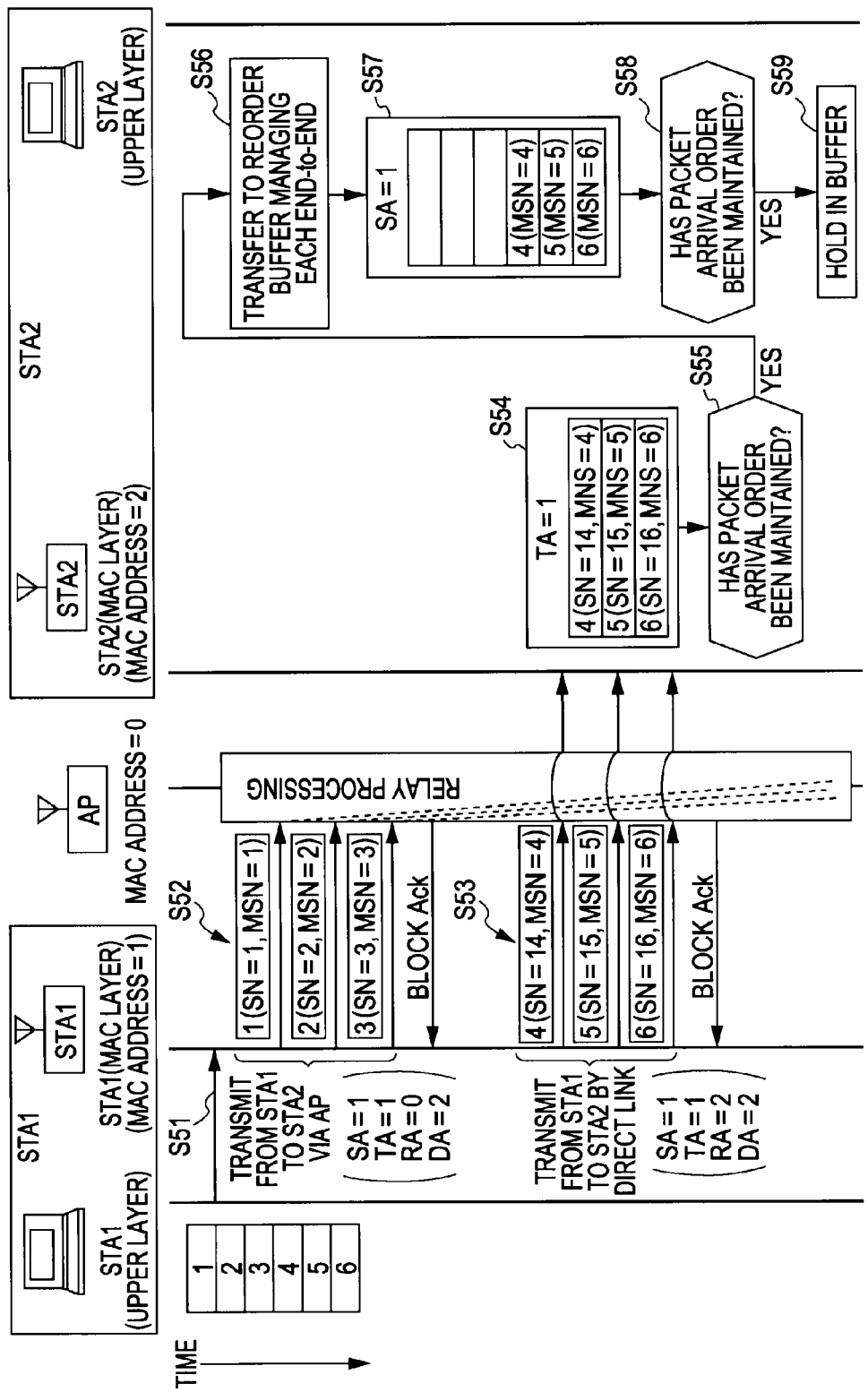
FIG. 7 is a diagram describing an example of a communication processing sequence using mesh sequence numbers.
Figure 8:
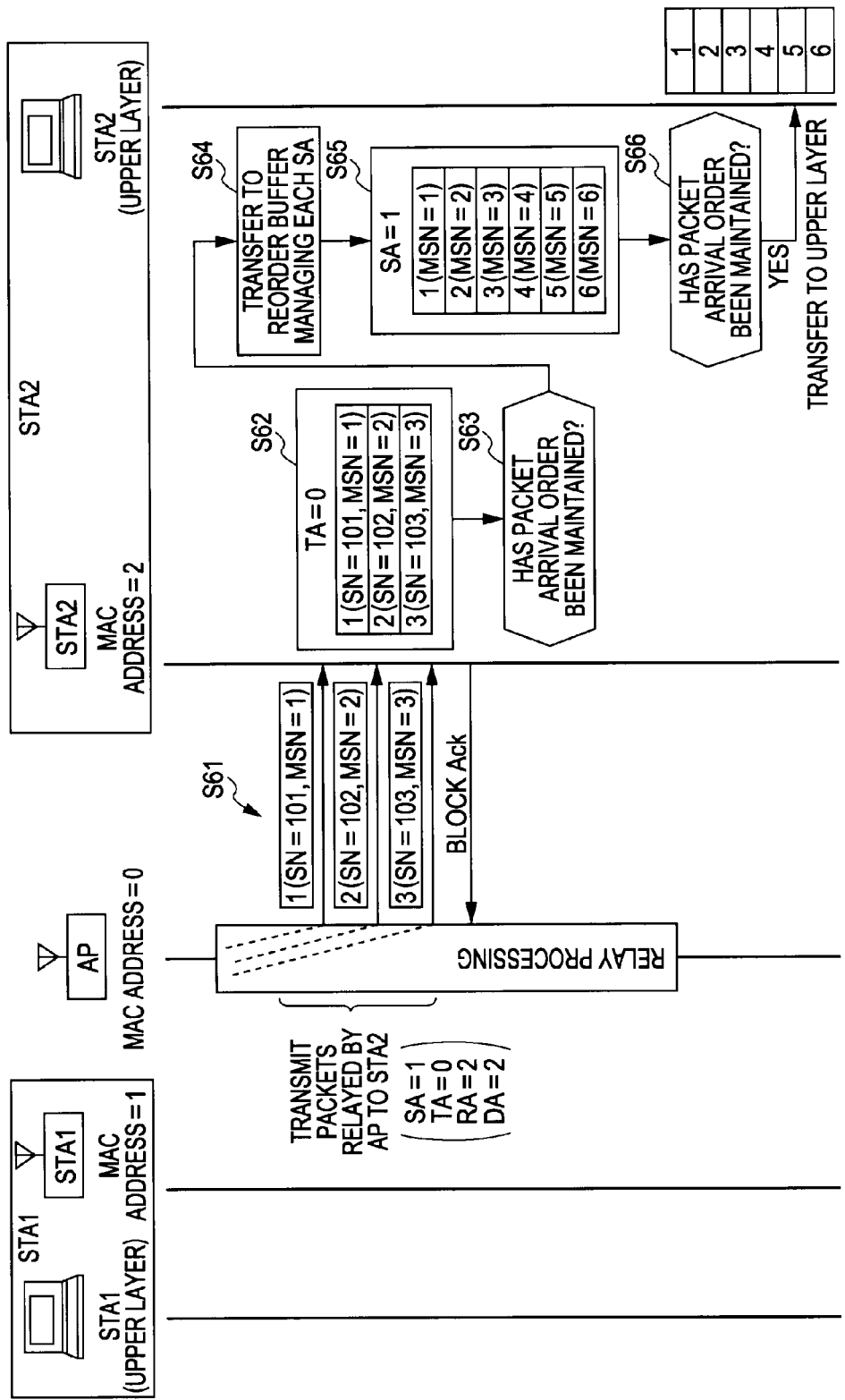
FIG. 8 is a diagram describing an example of a communication processing sequence using mesh sequence numbers.

Note that the source address (SA) and destination address (DA) described in the embodiments are MAC addresses of the End-to-End source and destination of the communication packets. Also, the transmitter address (TA) and receiver address (RA) are MAC addresses of the Peer-to-Peer source and destination of the data packets. These addresses (SA, TA, PA, DA) can each be indirectly obtained from the address field address field (the Addr1, Addr2, Addr3, Addr4 in the header shown in FIG. 6) included in the MAC header defined by 802.11.

The flow of processing in temporal order will be described following the sequence diagrams in FIGS. 11 and 12. In step S101, the upper layer of the STA1 supplies the communication packets 1 through 6 to the MAC layer serving as the wireless interface unit. In step S102, the MAC layer transmits the data packets 1 through 3 over a path via the AP (AP-routed path). Note that the address information set to the MAC headers of the transmitted packets 1 through 3 is as follows.

Source address (SA) indicating the data source=1
Transmitter address (TA) indicating the data source in the case of direct communication=1
Receiver address (RA) indicating the data receiver in the case of direct communication=0
Destination address (DA) indicating the data destination=2

This address information is set to the MAC headers of the packets 1 through 3. Note that the sequence numbers (SN=1 through 3) set by the STA1 are also recorded in the header.

Note that, as shown in the drawings,
MAC address of STA1=1,
MAC address of AP=0,
MAC address of STA1=2,
and the address settings are settings corresponding to these MAC addresses.

Next, in step S103, the MAC layer of the STA1 uses the inter-STA direct communication path (direct link path) to transmit the packets 4 through 6. Note that the address information set to the MAC headers of the transmission packets 4 through 6 is as follows.

Source address (SA) indicating the data source=1
Transmitter address (TA) indicating the data source in the case of direct communication=1
Receiver address (RA) indicating the data receiver in the case of direct communication=2
Destination address (DA) indicating the data destination=2

This address information is set to the MAC headers of the packets 4 through 6. Note that the sequence numbers (SN=4 through 6) set by the STA1 are also recorded in the header.

The STA2 at the data reception side receives the packets 1 through 6. The packet 1 transmitted using the AP-routed path takes more transfer time, since relay processing is performed at the AP.

As a result, as shown in the drawing, the packets 4 through 6 transmitted using the inter-STA direct communication path (direct link path) are received at the MAC layer of the STA2 in step S104 first, and are stored in the re-order buffer. The re-order buffer, which the communication device according to the present embodiment has, is managed in increments of original sources of the packets, i.e., in increments of source addresses (SA), as described above.

The packets 4 through 6 are packet having a common SA=1 (STA1 MAC address=1), and the packets 4 through 6 are stored in a reorder buffer corresponding to SA=1, and the packet order is ordered following the sequence numbers (SN=4 through 6). In step S105, confirmation is made regarding whether or not that the order of the packets is arrayed in the sequence number order. At this point in time, the sequence numbers are only SN=4 through 6, and the preceding sequence numbers SN=1 through 3 have not been stored yet. In this case, determination in step S105 is No. That is to say, determination is made that the orderliness of packets is not maintained, so no transfer is made to the upper layer, and in step S106 the packets remain held without change in the re-order buffer.

Subsequently, in step S121 shown in FIG. 12, the AP transmits the packets 1 through 3 to the MAC layer of the STA2, via AP-routed path. Note that the address information set to the MAC headers of the transmission packets 1 through 3 is as follows.

Source address (SA) indicating the data source=1
Transmitter address (TA) indicating the data source in the case of direct communication=0
Receiver address (RA) indicating the data receiver in the case of direct communication=2
Destination address (DA) indicating the data destination=2

This address information is set to the MAC headers of the packets 1 through 3. Note that the sequence numbers (SN=1 through 3) set by the STA1 are also recorded in the header without being changed by the AP.

In step S122, the STA2 MAC layer stores these packets in the re-order buffer. As described above, the re-order buffer is a re-order buffer managed in increments of original sources of the packets, i.e., in increments of source addresses (SA).

The packets 1 through 3 are packet having a common SA=1 (STA1 MAC address=1), and the packets 1 through 3 are stored in the reorder buffer corresponding to SA=1. The packets 4 through 6 which have already been received via the direct link path are stored in the SA=1 re-order buffer, and accordingly the packets 1 through 3 are additionally stored here. The control unit of the communication device makes reference to the sequence numbers of the packets 1 through 6 at the time of additionally storing the packets 1 through 3 in the re-order buffer so as to array the order of the packets following the sequence number (SN=1 through 6).

Next, in step S123, confirmation is made regarding whether or not that the order of the packets is arrayed in the sequence number order. The packets of SN=1 through 6 are stored in the re-order buffer, so determination in step S123 is Yes. Based on this determination, in step S124, the packets are provided to the upper layer which executes applications and the like which execute data processing on the received packets.

The order of packets which the upper layer receives is the packet order stored in the re-order buffer corresponding to SA=1, i.e., the order of packets 1 through 6. This matches the transmission order at the STA1.

As described above, the first embodiment described with reference to FIGS. 11 and 12 uses the MAC header defined in 802.11 and the re-order buffer corresponding to SA=1, thereby enabling the End-to-End orderliness to be maintained.

Note that with the first embodiment, that the node which performs relay processing of the packets, i.e., the access point AP, should not perform rewriting of the sequence numbers set in the headers of the packets to be transferred. Also, the sequence numbers set at the data source STA1 are set as sequence numbers continuous in increments of destination addresses (DA).

Note that the source address (SA) and destination address (DA) to be recorded in the packet header with the present embodiment can be recorded in the address field stipulated in the MAC header of the packet header stipulated in 802.11 (see FIG. 6), so the header configuration does not have to be changed.

Second Embodiment

Next, a second embodiment of the present invention will be described. With the second embodiment, the access point AP executes rewriting of the sequence number set in the packet header, the same as with systems according to the related art. This is the same as Peer-to-Peer managing processing the same as the already-existing 802.11.

At the time of transmitting data packets, the STA1 which is the transmitting side device manages sequence numbers to be set in packet headers, in increments of receiver addresses (PA) which indicate the direct data receiver of the packets. This also is the same as Peer-to-Peer managing processing the same as the already-existing 802.11.

In the second embodiment, at the time of performing path changing, the STA1 which is the data transmitting side transmits a path change request to the STA2 which is the data receiving side. The STA2 receives the path change request from the STA1, and in the case of accepting path changing, transmits a path change response to the STA1. The path change response which the STA2 transmits to the STA1 stores (a) The sequence number of the last packet received from the source STA1 at the point-in-time of reception of the path change request (Latest Sequence Number) by the STA2, and (b) a last sequence number (WinEnd) storable in the re-order buffer which the STA2 manages in increments of the source address (SA), which are notified to the STA1.

Figure 13:
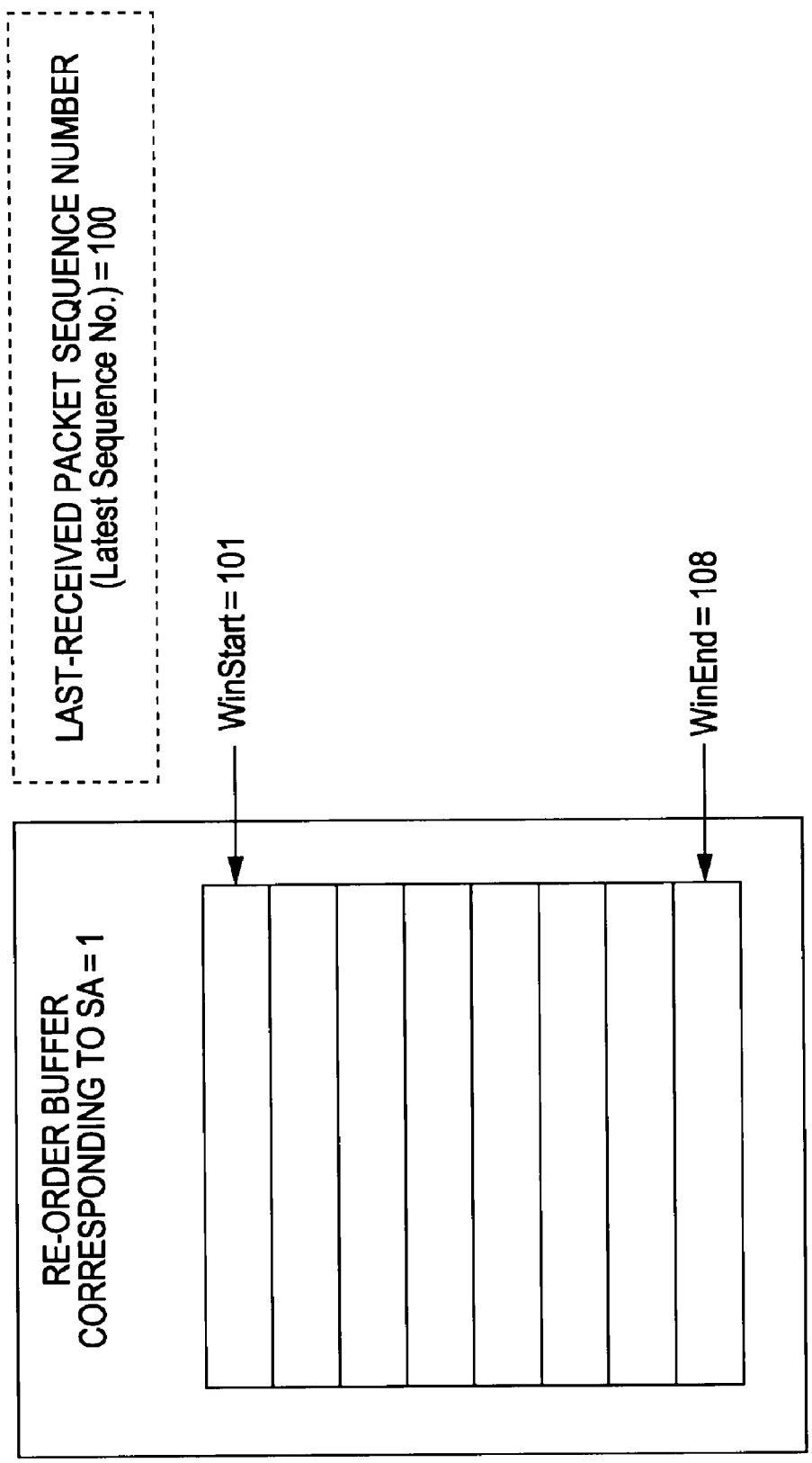
FIG. 13 is a diagram describing a re-order buffer which a wireless communication device uses.

These data will be described with reference to FIG. 13. FIG. 13 illustrates a re-order buffer which the STA2 manages in increments of source addressees (SA). This re-order buffer is a re-order buffer corresponding to the source address SA=1 of the STA 1.

We will say that, at the point in time that the STA2 receives the path change request, the sequence number of the latest packet which has been received from the STA1 (latest sequence number) is SN=100. This sequence number is a sequence number set to the header of the packet received over the AP-routed path for example, and is a sequence number set by the access point AP at the time of replay processing.

The source address (SA=1) is also recorded in the header of the latest received packet as well, and the STA2 verifies the re-order buffer corresponding to that source address (SA) and calculates the latest sequence number which can be stored in the re-order buffer (WinEnd).

The STA2 calculates latest sequence number which can be stored in the re-order buffer (WinEnd), based on the latest received packet sequence number SN=100 and the buffer size of the re-order buffer corresponding to SA=1. With the example shown in the drawing, of the re-order buffer corresponding to SA=1 is capable of storing eight packets, and assuming that packets of continuous sequence numbers have been received following SN=100, packets of SN=101 through 108 can be stored. This storable latest sequence number SN=108 is set as "WinEnd". The first sequence number newly stored in the re-order buffer SN=101 is "WinStart". That is to say, the SA=1 re-order buffer which the STA2 manages is in a state capable of receiving eight new packets from the STA1.

Thus, the STA2 stores the two data of (a) the sequence number of the last packet received from the source STA1 at the point-in-time of reception of the path change request by the STA2 (Latest Sequence Number), and (b) a last sequence number (WinEnd) storable in the re-order buffer which the STA2 manages in increments of the source address (SA), and notifies the STA1.

The STA1 determines the sequence number to be set to transmitted packets following changing of the path, based on the two data received from the STA2. The STA1 takes a sequence number X to be set to packets to be transmitted with the communication path changed from the AP-routed path which had been used up to then to the direct link path, as the following value.

Latest Sequence Number<X≦WinEnd

In the above example,
Latest Sequence Number=100
WinEnd=108
are the settings, so

100<X≦108 holds.

Note that in the event of continuously transmitting multiple packets as a block, all of the sequence numbers to be set to the multiple packets are preferably set so as to satisfy the above conditions.

In the event of performing processing, the STA2 which is the data receiving side has to calculate or hold the latest sequence number of the received packet, and the latest sequence number (WinEnd) storable in the re-order buffer managed in increments of source addresses (SA). This processing sequence will be described with reference to FIG. 14.

Figure 14:
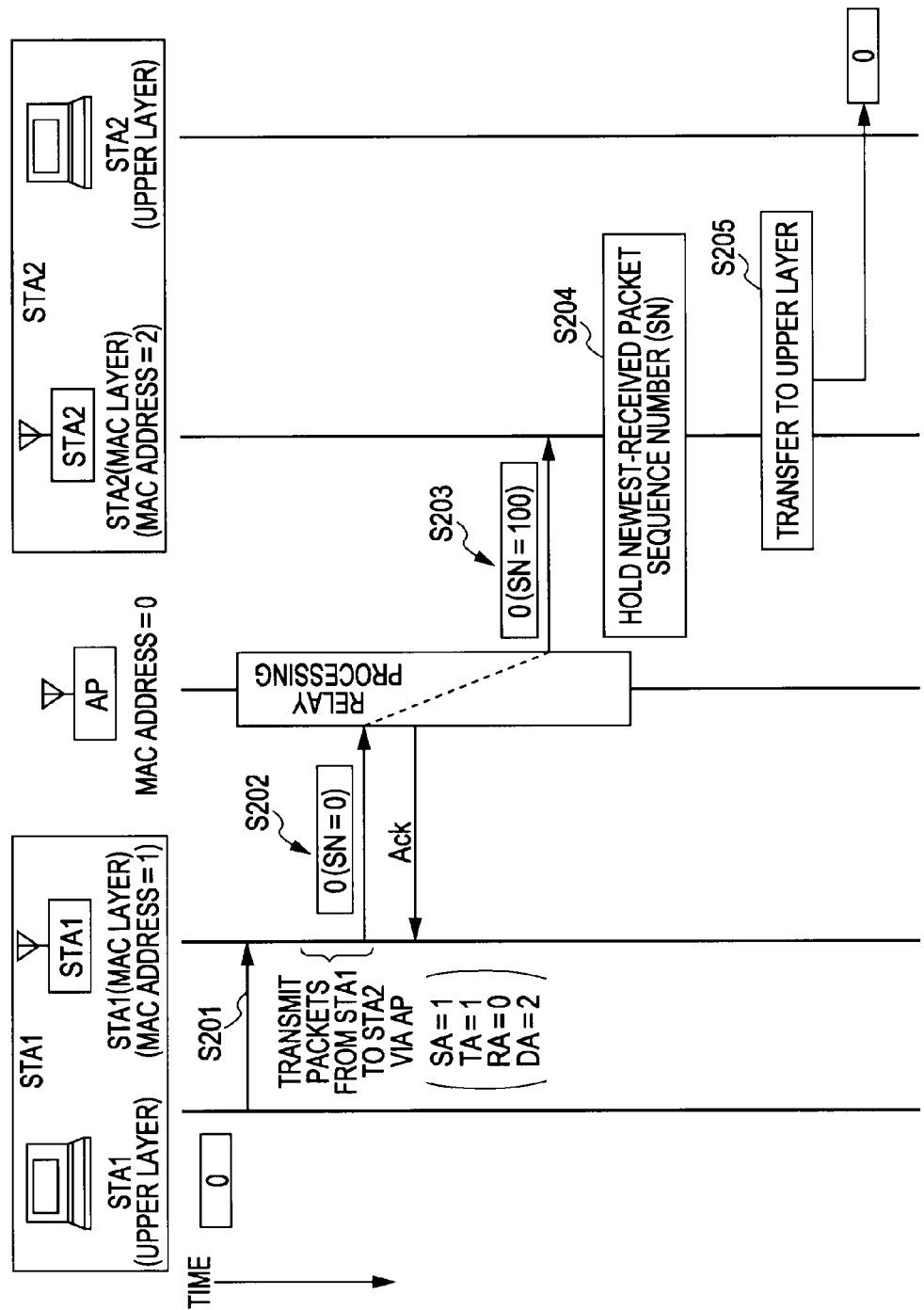
FIG. 14 is a diagram describing a communication sequence involving path switching according to an embodiment of the present invention.
Figure 15:
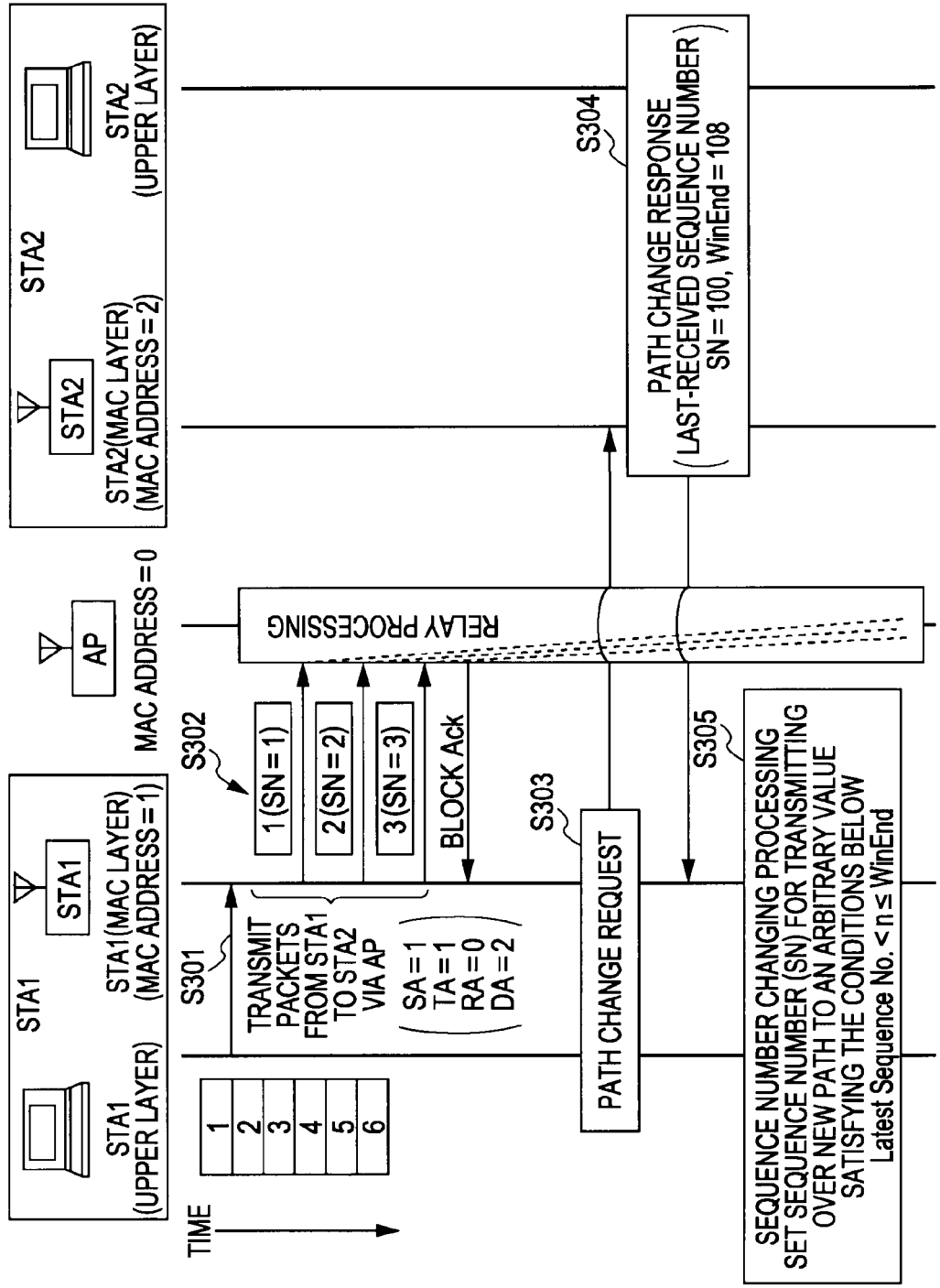
FIG. 15 is a diagram describing a communication sequence involving path switching according to an embodiment of the present invention.

FIG. 14 illustrates, from the left, a wireless communication device STA1 which is a data transmission device, an access point AP serving as a communication relay device, and a wireless communication device STA2 which is a data reception device. Note that the wireless communication device STA1 is illustrated with the upper layer such as applications performing generating and supply processing of communication data and so forth, and the MAC layer which receives the transmission data from the upper layer and performs transmission processing, shown separately. Also, the wireless communication device STA2 is shown with the upper layer and MAC layer separated.

The STA1 and STA2 are executing communication using the AP-routed path. In step S201, the upper layer of the STA1 supplies a communication packet 0 to the MAC layer serving as the wireless interface unit. In step S202, the MAC layer transmits the data packet 0 over a path via the AP (AP-routed path). Note that the address information set to the MAC header of the transmitted packet 0 is as follows.

Source address (SA) indicating the data source=1

Transmitter address (TA) indicating the data source in the case of direct communication=1

Receiver address (RA) indicating the data receiver in the case of direct communication=0

Destination address (DA) indicating the data destination=2

This address information is set to the MAC header of the packet 0. Note that the following information set by the STA1 is also recorded in the header.

Sequence number (SN=0)

In step S203, the access point AP which performs relay processing transmits a relayed packet in which a new sequence number (SN=100) has been set, to the STA2.

The STA2 temporarily stores the received packet in the re-order buffer corresponding to SA=1, and then transfers this to the upper layer. Further, the STA2 holds the sequence number (SN=100) set in the header of the packet received from the AP, by storing in memory.

Further, in the event of receiving a path change request from the STA1, the STA2 performs processing for calculating the latest sequence number (WinEnd) storable in the re-order buffer, based on the buffer side of the re-order buffer corresponding to SA=1.

Next, the communication processing sequence according to the second embodiment of the present invention will be described with reference to FIGS. 15 through 18. FIGS. 15 through 18 illustrate, from the left, a wireless communication device STA1 which is a data transmission device, an access point AP serving as a communication relay device, and a wireless communication device STA2 which is a data reception device.

Note that the wireless communication device STA1 is illustrated with the upper layer such as applications performing generating and supply processing of communication data and so forth, and the MAC layer which receives the transmission data from the upper layer and performs transmission processing, shown separately. Also, the wireless communication device STA2 is shown with the upper layer and MAC layer separated. Regarding hardware, the upper layer is configured of a data processing unit and so forth, and the MAC layer is configured of a wireless interface unit and so forth. Moreover, control is performed of both the upper layer and MAC layer under control of the control unit.

In the example shown in FIGS. 15 through 18, the STA1 performs data transmission to the STA2. The packets 1 through 3 are transmitted using the AP-routed path, and the packets 4 and on are transmitted using the direct link path. Note that at the time of changing the path, the above-described path change request and path change response are exchanged between the STA1 and STA2. The processing of each step shown in FIGS. 15 through 18 will now be described.

First, in step S301, the communication packets 1 through 6 are supplied to the MAC layer serving as the wireless interface unit. In step S302, the MAC layer transmits the data packets 1 through 3 over a path via the AP (AP-routed path). Note that the address information set to the MAC headers of the transmitted packets 1 through 3 is as follows.

Source address (SA) indicating the data source=1
Transmitter address (TA) indicating the data source in the case of direct communication=1
Receiver address (RA) indicating the data receiver in the case of direct communication=0
Destination address (DA) indicating the data destination=2

This address information is set to the MAC headers of the packets 1 through 3. Note that the sequence numbers (SN=1 through 3) set by the STA1 are also recorded in the header.

Note that, as shown in the drawings,
MAC address of STA1=1,
MAC address of AP=0,
MAC address of STA1=2,
and the above address settings are settings corresponding to these MAC addresses.

Next, in step S303, the STA1 transmits a path change request to change the communication path from the AP-routed path to the direct link path, to the STA2. This path change request is transmitted using the direct link path.

In step S304 the data receiving side STA2 transmits to the STA1 a path change response indicating that the path change is accepted. This path change response is also transmitted using the direct link path.

As described above, the path change response which the STA2 transmits to the STA1 includes (a) The sequence number of the last packet received from the source STA1 at the point-in-time of reception of the path change request (Latest Sequence Number) by the STA2, and (b) a last sequence number (WinEnd) storable in the re-order buffer which the STA2 manages in increments of the source address (SA), which are stored and notified to the STA1.

With the processing example shown in the drawing, the settings are such that (a) Latest Sequence Number=100, and
(b) last sequence number (WinEnd) storable in the re-order buffer corresponding to STA1=108.

In step S305, the STA1 determines the sequence number to be set to transmitted packets following changing of the path, based on the two values stored in the path change response received from the STA2.

The STA1 takes a sequence number X to be set to packets to be transmitted with the communication path changed from the AP-routed path which had been used up to then to the direct link path, as the following value.

Latest Sequence Number<X≦WinEnd

In the above example,
Latest Sequence Number=100
WinEnd=108
are the settings, so

100<X≦108 holds.

Note that in the event of continuously transmitting multiple packets as a block, all of the sequence numbers to be set to the multiple packets are preferably set so as to satisfy the above conditions.

Figure 16:
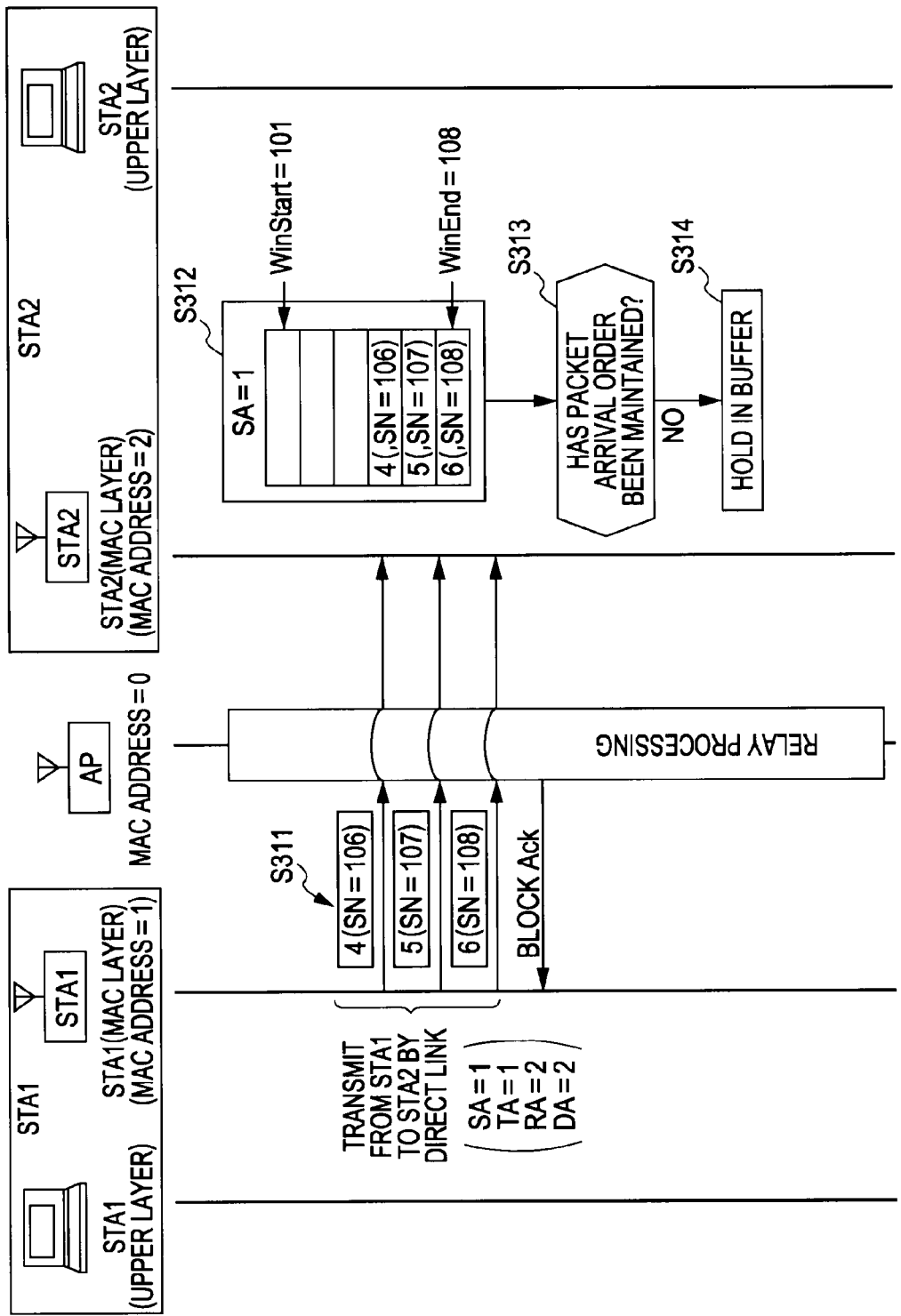
FIG. 16 is a diagram describing a communication sequence involving path switching according to an embodiment of the present invention.

In step S311 shown in FIG. 16, the STA1 transmits the packets 4 through 6 using the inter-STA direct communication path (direct link path). The address information set to the MAC headers of the transmitted packets 4 through 6 is as follows.

Source address (SA) indicating the data source=1
Transmitter address (TA) indicating the data source in the case of direct communication=1
Receiver address (RA) indicating the data receiver in the case of direct communication=2
Destination address (DA) indicating the data destination=2

This address information is set to the MAC headers of the packets 4 through 6.

The sequence numbers (SN=106 through 108) set by the STA1 are also recorded in the header. The sequence numbers SN=106 through 108 are sequence numbers which the STA1 has calculated as sequence numbers satisfying the conditional expression Latest Sequence Number<X≦WinEnd.

With this processing example, the data receiving side STA2 receives the packets 4 through 6 transmitted using the directly link path before the packets 1 through 3 transmitted over the AP-routed path. In step S312, the packets 4 through 6 transmitted using the inter-STA direct communication path (direct link path) are received at the MAC layer of the STA2, and are stored in the re-order buffer. The re-order buffer is managed in increments of original sources of the packets, i.e., in increments of source addresses (SA), as described above.

The packets 4 through 6 are packet having a common SA=1 (STA1 MAC address=1), and the packets 4 through 6 are stored in a reorder buffer corresponding to SA=1, and the packet order is ordered following the sequence numbers (SN=106 through 108). Note that the start of the re-order buffer is set as the storage portion of the packet of the sequence number corresponding to WinStart, and the end thereof as the storage portion of the packet of the sequence number corresponding to WinEnd.

In step S313, confirmation is made regarding whether or not that the order of the packets is arrayed in the sequence number order. At this point in time, the sequence numbers are only SN=106 through 108, and the preceding sequence numbers SN=101 through 105 have not been stored yet. In this case, determination in step S313 is No. That is to say, determination is made that the orderliness of packets is not maintained, so no transfer is made to the upper layer, and in step S314 the packets remain held without change in the re-order buffer.

Subsequently, in step S321 shown in FIG. 17, the AP transmits the packets 1 through 3 to the MAC layer of the STA2, via AP-routed path. The address information set to the MAC headers of the transmission packets 1 through 3 is as follows.

Source address (SA) indicating the data source=1
Transmitter address (TA) indicating the data source in the case of direct communication=0
Receiver address (RA) indicating the data receiver in the case of direct communication=2
Destination address (DA) indicating the data destination=2

This address information is set to the MAC headers of the packets 1 through 3. Note that the sequence numbers (SN=101 through 103) newly set by the AP are also recorded in the header.

The sequence numbers SN=101 through 103 are sequence numbers which are continuous from the sequence number 100 already transmitted to the STA2 via the AP earlier. That is to say, these are continuous numbers continuing from the latest sequence number SN=100 described above. Basically, if there is no change in the priority settings of data packets which the STA1 transmits, a continuous sequence number is set at the AP.

In step S322, the STA2 MAC layer stores these packets 1 through 3, transmitted via the AP, in the re-order buffer. As described above, the re-order buffer is a re-order buffer managed in increments of original sources of the packets, i.e., in increments of source addresses (SA).

The packets 1 through 3 are packet having a common SA=1 (STA1 MAC address=1), and the packets 1 through 3 are stored in the reorder buffer corresponding to SA=1. The packets 4 through 6 which have already been received via the direct link path are stored in the SA=1 re-order buffer in sequence number order (SN=106 through 108), and the packets 1 through 3 are additionally stored here. The control unit of the communication device makes reference to the sequence numbers of the packets 1 through 6 at the time of additionally storing the packets 1 through 3 in the re-order buffer so as to array the order of the packets following the sequence number.

As shown in step S322 in FIG. 17, the packets 1 through 3 with sequence numbers SN=101 through 103 are stored in the re-order buffer from the start, and the packets 4 through 6 with sequence numbers SN=106 through 108 are stored at the end.

Next, in step S323, confirmation is made regarding whether or not that the order of the packets is arrayed in the sequence number order. At this point, the packets with sequence numbers SN=104 through 105 have not yet been received, so determination is made that the arrival order of packets is not maintained, and the packets are not transferred to the upper layer. In step S325, the state is maintained wherein the packets are stored in the buffer without change.

Next, in steps S401 through S402 in FIG. 18, the STA1 sequentially transmits packets 7 through 11 via the direct link path. Sequence numbers SN=109 through 113 following the sequence numbers SN=106 through 108 set earlier to the packets 4 through 6 are set to these packets in the same way.

The STA2 receives these packets via the direct link path, and stores in the re-order buffer corresponding to the source address (SA=1) corresponding to the STA1. In the present example, the re-order buffer corresponding to (SA=1) is of a configuration capable of storing eight packets. The re-order buffer corresponding to (SA=1) already stores the packets 1 through 3 (SN=101 through 103) and the packets 4 through 6 (SN=106 through 108), so storing all of these packets is not possible. With the present processing example, the packet 6 with the sequence number=108 is stored at the end of the re-order buffer (WinEnd), and further addition of packets is not longer available in this state.

In this case, as shown in steps S411 through S412, in the event of receiving packets with sequence numbers exceeding the WinEnd being received, the STA2 performs processing of sequentially storing the received packet in the re-order buffer, and transferring the overflowed packets to the upper layer.

This processing will be described with reference to FIG. 19. Let us say that new received packets 7 through 11 (SN=109 through 113) 201 are received from the STA1, and these are to be stored in the re-order buffer 221 corresponding to the STA1. However, the re-order buffer 221 has no space to store the received packets 7 through 11 (SN=109 through 113) 201. In this case, packets are extracted in order from the head of the re-order buffer 221 and transferred to the upper layer. In this example, the packets 1 through 3 (SN=101 through 103) are extracted and transferred to the upper layer, and processing is performed for storing the received packets 7 through 11 (SN=109 through 113) 201 in the re-order buffer 221.

Returning to FIG. 18, let us continue description of the sequence according to the present embodiment. Following the newly received packets 7 through 11 (SN=109 through 113) being stored in the re-order buffer, in step S422 the STA2 determines whether or not the packets are stored in the re-order buffer in the order of arrival. At this point in time, the received packets 4 through 11 (SN=106 through 113) are stored in the re-order buffer. In this case, the determination at step S422 is Yes. Based on this determination, in step S423 the packets are provided to the upper layer which executes applications and the like which execute data processing on the received packets.

The order of packets which the upper layer receives is the packets 1 through 3 first transferred by overflowing from the re-order buffer, and subsequently the packets 4 through 11 stored in the re-order buffer, as shown in the drawing. This matches the transmission order at the STA1.

As described above, the second embodiment enables packet order to be maintained between the data source and destination, i.e., End-to-End, as with the case of the first embodiment. Note that with the second embodiment, the node which performs relay processing of the packets, i.e., the access point AP, performs the same processing as with the related art, and nothing has to be changed. That is to say, the AP may perform rewriting of the sequence numbers set in the headers of the packets to be transferred.

With the second embodiment, received packets are managed using a re-order buffer set in increments of source addresses (SA) at the packet receiving side, as with the case of the first embodiment.

The STA1 at the data transmitting side transmits a path change request to the receiving side STA2 at the time of switching the communication path, receives a path change response from the STA2, and uses the data stored in the path change response to determine the sequence numbers to set to the transmission packets following the path change.

The data stored in the path change response is
(a) The sequence number of the last packet received from the source STA1 at the point-in-time of reception of the path change request (Latest Sequence Number) by the STA2, and
(b) a last sequence number (WinEnd) storable in the re-order buffer which the STA2 manages in increments of the source address (SA),
which are notified to the STA1.

The STA1 determines the sequence number to be set to transmitted packet following changing of the path, based thereupon. That is to say, a sequence number satisfying the condition expression Latest Sequence Number<X≦WinEnd is calculated, and the calculated sequence number is set to the packet to be transmitted over the new path, and transmitted, whereby matching of packet order End-to-End can be realized.

With the above-described example, description has been made regarding an example of processing for changing from the AP-routed path to the direct link path. The path change request and path change response in this case are performed using the direct link path which is the new path.

Embodiments of the present invention are applicable to path switching other than the above-described processing, as well. Note, however, that the path change request and path change response are performed using the new path. For example, in a case wherein the old path is the direct link path and the new path is the AP-routed path, the path change request and path change response are performed using the AP-routed path. A communication sequence of path change request and path change response in a case that the old path is the direct link path and the new path is the AP-routed path is shown in FIG. 20.

In step S501, the STA1 is transmitting data to the STA2 via the direct link path. Subsequently, in the case of the STA1 performing a path change request to the AP-routed path, in step S502 the STA1 uses the AP-routed path to transmit a path change to the STA2.

In step S503, the STA2 transmits a path change response via the AP-routed path.

The data stored in the path change response is (a) The sequence number of the last packet received from the source STA1 at the point-in-time of reception of the path change request (Latest Sequence Number) by the STA2, and (b) a last sequence number (WinEnd) storable in the re-order buffer which the STA2 manages in increments of the source address (SA), which are stored and notified to the data transmitting side STA1 which has made the path change request.

Subsequently, in step S505, the STA1 starts data transmission using the new path, i.e., the AP-routed path. The sequence number to be set to the transmitted packet is, as with the processing example described above, a sequence number satisfying the condition expression Latest Sequence Number<X≦WinEnd.

The present invention has been described in detail with reference to specific examples. However, it is obvious that one skilled in the art can make modifications and substitutions of the embodiments without departing from the essence of the present invention. That is to say, the present invention has been disclosed by way of exemplary forms, and should not be interpreted restrictively. Determination of the essence of the present invention should take into consideration the Claims.

Also, the series of processing described in the Specification can be realized by hardware, software, or a combined configuration of both. In a case of realizing the processing with software, a program recording the processing sequence may be installed in memory within a computer built into dedicated hardware, or a program may be installed in a general-purpose computer capable of executing various types of processing, and executed. For example, the program may be recorded in a recording medium beforehand. Besides installed to a computer from a recording medium, the program may be received via a network such as a LAN (Local Area Network), the Internet, or the like, and installed in a recording medium such as a built-in hard disk or the like.

Also note that the various types of processing described in the Specification are not restricted to being executed in the time sequence following the description, and may be executed in parallel or individually in accordance with the processing capabilities of the device executing the processing, or as appropriate. Also, the term "system" in the present Specification implies a logical group configuration of multiple devices, and is not restricted to the devices of the configuration being within the same housing.

The present application contains subject matter related to that disclosed in Japanese Priority Patent Application JP 2008-213537 filed in the Japan Patent Office on Aug. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication device comprising:
   a control unit configured to control communication data; and
   memory configured to store communication data;
   wherein said control unit is further configured to
   set a re-order buffer corresponding to a source address for storing received data, the received data being stored in memory in re-order buffers according to increments of source addresses,
   store received packets from a single data source in said re-order buffer corresponding to a source address of the single data source, and
   arraying a packet order following sequence numbers set to the received packets.

2. The wireless communication device according to claim 1, wherein said received packets are packets where a sequence number set for each data destination address is recorded at the data source, and are packets where the sequence numbers are not rewritten at a relay point.

3. The wireless communication device according to claim 1, wherein said control unit is further configured to
   return a path change response in response to a path change request received from the data source; and
   store and transmit, in said path change response, information including
   a sequence number of a last packet received from the source at a point-in-time of reception of said path change request (Latest Sequence Number), and
   a last sequence number storable in said re-order buffer corresponding to the source address (WinEnd).

4. The wireless communication device according to claim 3, wherein said control unit is further configured to
   store packets received from said data source following said path change response in said re-order buffer corresponding to the source address, and
   when receiving a new received packet having a sequence number later than the last sequence number storable in said re-order buffer corresponding to a source address (WinEnd), store said newly received packet in the re-order buffer corresponding to the source address, and obtains a packet having a preceding sequence number from the re-order buffer corresponding to the source address.

5. A wireless communication device comprising:
a control unit for controlling communication data;
wherein said control unit
    transmits packets where sequence numbers set for each data destination address are set in a header of the packets,
    performs processing of transmitting a path change request to said data destination address at a time of changing a packet transmission path, and receiving a path change response as a reply, and
    performs processing of determining a sequence number to set in a header of a packet to be transmitted over a new path after path change, using an information of
        (a) a sequence number of a last packet received from the source at a point-in-time of reception of said path change request (Latest Sequence Number), and
        (b) a last sequence number storable in said re-order buffer corresponding to a source address (WinEnd), included in said path change response.

6. The wireless communication device according to claim 5, wherein said control unit sets a sequence number X to be set in the header of the packet to be transmitted over a new path after path change so as to satisfy the conditional expression Latest Sequence Number<X≦WinEnd.

7. A communication system comprising:
a plurality of wireless communication devices which perform data transmission/reception;
wherein a transmission device which transmits data performs processing of
    transmitting a path change request to a data destination address at a time of changing a packet transmission path,
    receiving a path change response as a reply,
    determining a sequence number to set in a header of a packet to be transmitted over a new path after path change, using an information of
        (a) a sequence number of a last packet received from the source at the point-in-time of reception of said path change request (Latest Sequence Number), and
        (b) a last sequence number storable in said re-order buffer corresponding to a source address (WinEnd), included in said path change response,
and wherein a reception device which receives data performs processing of
    returning a path change response storing the information of (a) and (b) in response to the path change request from said transmission device.

8. A wireless communication method executed at a wireless communication device, said method comprising:
    setting a re-order buffer corresponding to a source address for storing received data, the received data being stored in memory in re-order buffers according to increments of source addresses;
    storing received packets from a single data source in said re-order buffer corresponding to the source address: and
    arraying a packet order following sequence numbers set to the received packets.

9. A wireless communication method executed at a wireless communication device, said method comprising:
    transmitting packets where sequence numbers set for each data destination address are set in a header of the packets,
    transmitting a path change request to said data destination address at a time of changing a packet transmission path, and receiving a path change response as a reply; and
    determining a sequence number to set in a header of a packet to be transmitted over a new path after path change, using an information of
        (a) a sequence number of a last packet received from the source at a point-in-time of reception of said path change request (Latest Sequence Number), and
        (b) a last sequence number storable in said re-order buffer corresponding to a source address (WinEnd), included in said path change response.

10. A non-transitory computer-readable medium storing computer-readable instructions thereon for executing communication control at a wireless communication device, the computer-readable instructions when executed by a computer cause the computer to perform steps comprising:
    setting a re-order buffer corresponding to a source address for storing received data, the received data being stored in memory in re-order buffers according to increments of source addresses;
    storing received packets from a single data source in said re-order buffer corresponding to a source address; and
    arraying a packet order following sequence numbers set to the received packets.

11. A non-transitory computer-readable medium storing computer-readable instructions thereon for executing communication control at a wireless communication device, the computer-readable instruction when executed by a computer cause the computer to perform steps comprising:
    transmitting packets where sequence numbers set for each data destination address are set in a header of the packets,
    transmitting a path change request to said data destination address at a time of changing a packet transmission path, and receiving a path change response as a reply; and
    determining a sequence number to set in a header of a packet to be transmitted over a new path after path change, using an information of
        (a) a sequence number of a last packet received from the source at a point-in-time of reception of said path change request (Latest Sequence Number), and
        (b) a last sequence number storable in said re-order buffer corresponding to a source address (WinEnd), included in said path change response.

* * * * *